(12) United States Patent
Yu et al.

(10) Patent No.: US 9,603,121 B2
(45) Date of Patent: *Mar. 21, 2017

(54) SYSTEMS, METHODS, AND APPARATUSES FOR FACILITATING DEVICE-TO-DEVICE CONNECTION ESTABLISHMENT

(71) Applicant: NOKIA SOLUTIONS AND NETWORKS OY, Espoo (FI)

(72) Inventors: Ling Yu, Oulu (FI); Vinh Van Phan, Oulu (FI); Kari Veikko Horneman, Oulu (FI); Seppo Ilmari Vesterinen, Oulunsalo (FI); Timo Koskela, Oulu (FI); Tao Chen, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/147,926

(22) Filed: Jan. 6, 2014

(65) Prior Publication Data

US 2014/0120907 A1 May 1, 2014

Related U.S. Application Data

(63) Continuation of application No. 12/604,733, filed on Oct. 23, 2009, now Pat. No. 8,666,403.

(51) Int. Cl.
*H04W 4/00* (2009.01)
*H04W 68/02* (2009.01)
(Continued)

(52) U.S. Cl.
CPC ........... *H04W 68/02* (2013.01); *H04W 60/00* (2013.01); *H04W 76/023* (2013.01)

(58) Field of Classification Search
CPC .... H04W 60/00; H04W 68/02; H04W 76/023
(Continued)

(56) References Cited

U.S. PATENT DOCUMENTS 5,361,396 A 11/1994 Onoe et al.
5,995,500 A 11/1999 Ma et al.
(Continued)

FOREIGN PATENT DOCUMENTS

GB 2 336 070 A 10/1999
WO 2006/016329 A1 2/2006

OTHER PUBLICATIONS

IEEE Std 802.11—2007 (Revision of IEEE Std 802.11-1999) IEEE Standard for Information technology—Telecommunications and information exchange between systems—Local and metropolitan area networks—Specific requirements; "Part 11: Wireless LAN Medium Access Control (MAC) and Physical Layer (PHY) Specifications" IEEE Computer Society Sponsored by the LAN/MAN Standards Committee; IEEE, 3 Park Avenue, New York, NY 10016-5997, USA, Jun. 12, 2007.

(Continued)

*Primary Examiner* — Joseph Arevalo
(74) *Attorney, Agent, or Firm* — Squire Patton Boggs (US) LLP

(57) ABSTRACT

Methods, apparatuses, and systems are provided for facilitating device-to-device connection establishment. A method may include directing broadcast of an indication of a device-to-device registration area identification in each of one or more cells forming a device-to-device registration area identified by the device-to-device registration area identification. The method may further include directing receipt of a device-to-device registration request originated by a first terminal apparatus in response to the broadcast indication. The first terminal apparatus may be located within the registration area. The method may additionally include registering the first terminal apparatus based at least in part upon the device-to-device registration request. Corresponding apparatuses and systems are also provided.

16 Claims, 10 Drawing Sheets

(51) Int. Cl.
  *H04W 60/00* (2009.01)
  *H04W 76/02* (2009.01)
(58) Field of Classification Search
  USPC ...... 455/426.1, 435.1, 406, 419, 432.1, 434,
    455/452.1, 420, 445, 411, 450, 560,
    455/550.1, 422.1, 518
  See application file for complete search history.

(56) References Cited

U.S. PATENT DOCUMENTS

| | | | |
|---|---|---|---|
| 6,415,146 | B1 | 7/2002 | Capece |
| 6,453,174 | B1 | 9/2002 | Cunningham et al. |
| 6,545,988 | B1 | 4/2003 | Skog |
| 6,580,704 | B1 | 6/2003 | Wellig et al. |
| 7,003,295 | B1 | 2/2006 | Cook et al. |
| 8,059,586 | B2* | 11/2011 | Bi ................... H04W 60/00 370/328 |
| 8,196,186 | B2* | 6/2012 | Mityagin ............ G06F 21/335 713/159 |
| 2004/0064568 | A1* | 4/2004 | Arora .................. H04L 29/06 709/228 |
| 2006/0063532 | A1* | 3/2006 | Chou et al. ................. 455/445 |
| 2006/0135174 | A1* | 6/2006 | Kraufvelin ........... H04W 64/00 455/456.1 |
| 2006/0160544 | A1 | 7/2006 | Sun et al. |
| 2006/0178148 | A1 | 8/2006 | Du et al. |
| 2006/0218393 | A1* | 9/2006 | Hernandez ........... H04L 63/08 713/167 |
| 2006/0252377 | A1* | 11/2006 | Jeong ................... H04W 24/10 455/67.13 |
| 2008/0188221 | A1* | 8/2008 | Hashimoto .......... H04W 48/02 455/435.1 |
| 2008/0270619 | A1 | 10/2008 | Davies et al. |
| 2009/0003543 | A1* | 1/2009 | Altberg ................... H04M 3/42 379/88.13 |
| 2010/0040029 | A1* | 2/2010 | Doppler ............... H04W 28/18 370/338 |
| 2010/0311419 | A1* | 12/2010 | Bi ........................ H04W 60/00 455/435.1 |

OTHER PUBLICATIONS

IEEE Std 802.15—2005 (Revision of IEEE Std 802.15.1-2002) IEEE Standard for Information technology—Telecommunications and information exchange between systems—Local and metropolitan area networks—Specific requirements; Part 15.1: Wireless medium access control (MAC) and physical layer (PHY) specifications for wireless personal area networks (WPANs); IEEE Computer Society, Sponsored by the LAN/MAN Standards Committee; IEEE, 3 Park Avenue, New York, NY 10016-5997, USA, Jun. 14, 2005.

IEEE Std 802.16—2009 (Revision of IEEE Std. 802.16.2004) IEEE Standard for Local and metropolitan area networks "Part 16: Air Interface for Fixed Broadband Wireless Access Systems", IEEE Computer Society and IEEE Microwave Theory and Techniques Society sponsored by the LAN/MAN Standards Committee May 29, 2009, IEEE, 3 Park Avenue, New York, NY 10016-5997, USA.

\* cited by examiner

SYSTEMS, METHODS, AND APPARATUSES FOR FACILITATING DEVICE-TO-DEVICE CONNECTION ESTABLISHMENT

CROSS REFERENCE TO RELATED APPLICATIONS

This application is a continuation of U.S. patent application Ser. No. 12/604,733, filed Oct. 23, 2009. The contents of which this application is hereby incorporated by reference.

TECHNOLOGICAL FIELD

Embodiments of the present invention relate generally to communication technology and, more particularly, relate to systems, methods, and apparatuses for facilitating device-to-device connection establishment.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer and providing convenience to users.

Current and future networking technologies continue to facilitate ease of information transfer and convenience to users. In order to provide easier or faster information transfer and convenience, telecommunication industry service providers are developing improvements to existing networks. One ongoing area of development in networking and communication technology is the development of device-to-device (D2D) communication technologies. D2D communication technologies may use radio resources of a hosting cellular system, but allow two computing devices, such as mobile terminals (also referred to as user equipment (UE)), to communicate directly with each other without routing their communications through components of the cellular system. Thus, the direct communication link between mobile terminals engaged in D2D communication may result in reduced end-to-end delay time for data exchanged between the terminals as compared to indirect communication via cellular system components. D2D communication may accordingly provide support for use of peer-to-peer applications, head-to-head gaming applications, collaboration, and/or the like by users of mobile terminals within close proximity of each other.

BRIEF SUMMARY OF SOME EXAMPLES OF THE INVENTION

Systems, methods, apparatuses, and computer program products are therefore provided for facilitating device-to-device connection establishment. In this regard, systems, methods, apparatuses, and computer program products are provided that may provide several advantages to computing devices, computing device users, and network operators. Embodiments of the invention allow networks to handle registration of terminal apparatuses for D2D services and manage allocation of resources for D2D connections. For example, some embodiments of the invention allow network operators to manage resource allocation for in-band D2D communication such that D2D communication does not interfere with other communications over a host cellular network. In this regard, some embodiments of the invention allow a network operator to manage allocation of network resources to D2D connections through the use of resource allocation tokens.

In addition to giving networks the ability to manage resource allocation for D2D connections, embodiments of the invention reduce the burden imposed on networks by not requiring networks to have preliminary knowledge of whether terminal apparatuses on the network are capable of establishing a device-to-device connection. In this regard, terminal apparatuses in accordance with some embodiments of the invention use cognitive radio (CR) capabilities to sense other terminal apparatuses within a proximate range and then may send a request to the network to establish a D2D connection with a sensed terminal apparatus. Accordingly, embodiments of the invention reduce signaling overhead that would otherwise be required to collect up-to-date measurement reports from a terminal apparatus regarding other terminal apparatuses within range of the terminal apparatus, as in accordance with embodiments of the invention, D2D user detection is distributed among the terminal apparatuses accessing the network and D2D connection establishment procedures are initiated by terminal apparatuses.

Embodiments of the invention further reduce the signaling and processing overhead required for registering D2D capable terminal apparatuses through the use of broadcast D2D registration area identification. A terminal apparatus according to an embodiment of the invention is enabled by such embodiments of the invention to determine when the terminal apparatus has entered a new D2D registration area and thus when the terminal apparatus needs to transmit a D2D registration request to the network. Accordingly, such embodiments of the invention may reduce the number of registration requests transmitted over the network and consequently may reduce the number of corresponding D2D registration procedures that network elements may have to execute. Some embodiments of the invention further provide for the use of paging areas that may reduce the number of cells over which a terminating terminal apparatus for a requested D2D connection is paged, thus reducing burden and overhead on network components that might otherwise be expended in paging a terminal apparatus over cells in which the terminating terminal apparatus can be determined not to be located based on a D2D connection establishment request.

In a first example embodiment, a method is provided, which comprises directing broadcast of an indication of a device-to-device registration area identification in each of one or more cells that comprise a device-to-device registration area identified by the device-to-device registration area identification. The method of this embodiment further comprises directing receipt of a device-to-device registration request originated by a first terminal apparatus in response to the broadcast indication. In the method of this embodiment, the first terminal apparatus is located within the registration area. The method of this embodiment also comprises registering the first terminal apparatus based at least in part upon the device-to-device registration request.

In another example embodiment, an apparatus is provided. The apparatus of this embodiment comprises at least one processor and at least one memory storing computer program code, wherein the at least one memory and stored computer program code are configured to, with the at least one processor, cause the apparatus to at least direct broadcast of an indication of a device-to-device registration area identification in each of one or more cells that comprise a device-to-device registration area identified by the device-to-device registration area identification. The at least one memory and stored computer program code are configured to, with the at least one processor, further cause the apparatus of this embodiment to receive a device-to-device registration request originated by a first terminal apparatus in response to the broadcast indication. In the apparatus of this embodiment, the first terminal apparatus is located within the registration area. The at least one memory and stored computer program code are configured to, with the at least one processor, additionally cause the apparatus of this embodiment to register the first terminal apparatus based at least in part upon the device-to-device registration request.

In another example embodiment, a computer program product is provided. The computer program product of this embodiment includes at least one computer-readable storage medium having computer-readable program instructions stored therein. The program instructions of this embodiment comprise program instructions configured for directing broadcast of an indication of a device-to-device registration area identification in each of one or more cells that comprise a device-to-device registration area identified by the device-to-device registration area identification. The program instructions of this embodiment further comprise program instructions configured for directing receipt of a device-to-device registration request originated by a first terminal apparatus in response to the broadcast indication. In the computer program product of this embodiment, the first terminal apparatus is located within the registration area. The program instructions of this embodiment also comprise program instructions configured for registering the first terminal apparatus based at least in part upon the device-to-device registration request.

In another example embodiment, an apparatus is provided that comprises means for directing broadcast of an indication of a device-to-device registration area identification in each of one or more cells that comprise a device-to-device registration area identified by the device-to-device registration area identification. The apparatus of this embodiment further comprises means for directing receipt of a device-to-device registration request originated by a first terminal apparatus in response to the broadcast indication. In the apparatus of this embodiment, the first terminal apparatus is located within the registration area. The apparatus of this embodiment also comprises means for registering the first terminal apparatus based at least in part upon the device-to-device registration request.

In another example embodiment, a method is provided, which comprises determining a paging area for a first terminal apparatus based at least in part upon a connection establishment request originated by the first terminal apparatus seeking to establish a connection with a second terminal apparatus. The method of this embodiment further comprises directing paging the second terminal apparatus only in the determined paging area to facilitate establishment of a device-to-device connection between the first terminal apparatus and the second terminal apparatus in response to the connection establishment request.

In another example embodiment, an apparatus is provided. The apparatus of this embodiment comprises at least one processor and at least one memory storing computer program code, wherein the at least one memory and stored computer program code are configured to, with the at least one processor, cause the apparatus of this embodiment to at least determine a paging area for a first terminal apparatus based at least in part upon a connection establishment request originated by the first terminal apparatus seeking to establish a connection with a second terminal apparatus. The at least one memory and stored computer program code are configured to, with the at least one processor, further cause the apparatus of this embodiment to direct paging the second terminal apparatus only in the determined paging area to facilitate establishment of a device-to-device connection between the first terminal apparatus and the second terminal apparatus in response to the connection establishment request.

In another example embodiment, a computer program product is provided. The computer program product includes at least one computer-readable storage medium having computer-readable program instructions stored therein. The computer-readable program instructions may include a plurality of program instructions. The program instructions of this embodiment comprise program instructions configured for determining a paging area for a first terminal apparatus based at least in part upon a connection establishment request originated by the first terminal apparatus seeking to establish a connection with a second terminal apparatus. The program instructions of this embodiment further comprise program instructions configured for directing paging the second terminal apparatus only in the determined paging area to facilitate establishment of a device-to-device connection between the first terminal apparatus and the second terminal apparatus in response to the connection establishment request.

In another example embodiment, an apparatus is provided. The apparatus of this embodiment comprises means for determining a paging area for a first terminal apparatus based at least in part upon a connection establishment request originated by the first terminal apparatus seeking to establish a connection with a second terminal apparatus. The apparatus of this embodiment further comprises means for directing paging the second terminal apparatus only in the determined paging area to facilitate establishment of a device-to-device connection between the first terminal apparatus and the second terminal apparatus in response to the connection establishment request.

In another example embodiment, a method is provided, which comprises receiving, at a terminal apparatus, a broadcast indication of a device-to-device registration area identification. The method of this embodiment further comprises determining, based at least in part upon the indication, that the terminal apparatus has entered a new device-to-device registration area. The method of this embodiment additionally comprises transmitting a device-to-device registration request in response to the determination.

In another example embodiment, an apparatus is provided. The apparatus of this embodiment comprises at least one processor and at least one memory storing computer program code, wherein the at least one memory and stored computer program code are configured to, with the at least one processor, cause the apparatus to at least receive a broadcast indication of a device-to-device registration area identification. The at least one memory and stored computer program code are configured to, with the at least one processor, further cause the apparatus of this embodiment to determine, based at least in part upon the indication, that the apparatus has entered a new device-to-device registration area. The at least one memory and stored computer program code are configured to, with the at least one processor, additionally cause the apparatus of this embodiment to transmit a device-to-device registration request in response to the determination.

In another example embodiment, a computer program product is provided. The computer program product includes at least one computer-readable storage medium having computer-readable program instructions stored therein. The computer-readable program instructions may include a plurality of program instructions. The program instructions of this embodiment comprise program instructions configured for directing receipt by a terminal apparatus of a broadcast indication of a device-to-device registration area identification. The program instructions of this embodiment further comprise program instructions configured for determining, based at least in part upon the indication, that the terminal apparatus has entered a new device-to-device registration area. The program instructions of this embodiment additionally comprise program instructions configured for directing transmission of a device-to-device registration request in response to the determination.

In another example embodiment, an apparatus is provided that comprises means for receiving a broadcast indication of a device-to-device registration area identification. The apparatus of this embodiment further comprises means for determining, based at least in part upon the indication, that the apparatus has entered a new device-to-device registration area. The apparatus of this embodiment additionally comprises means for transmitting a device-to-device registration request in response to the determination.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
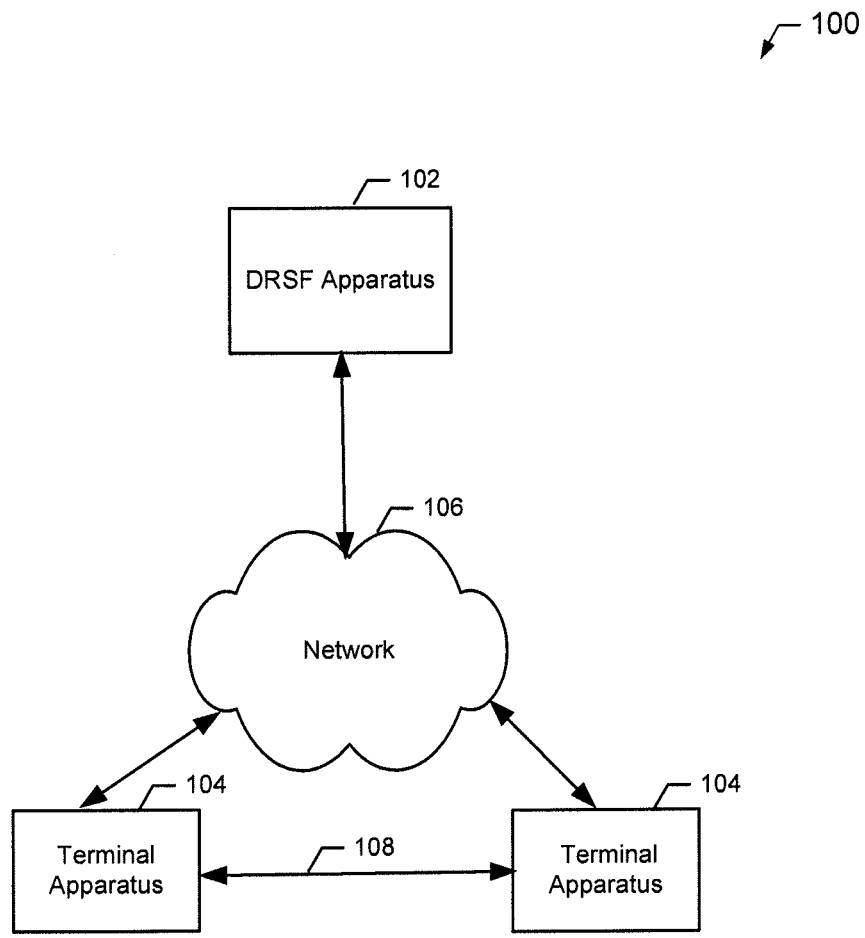
FIG. 1 illustrates a system for facilitating device-to-device connection establishment according to an example embodiment of the present invention.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of a system 100 for facilitating device-to-device connection establishment according to an example embodiment of the present invention. It will be appreciated that the system 100 is provided as an example of one embodiment of the invention and should not be construed to narrow the scope or spirit of the invention in any way. In this regard, the scope of the invention encompasses many potential embodiments in addition to those illustrated and described herein. As such, while FIG. 1 illustrates one example of a configuration of a system for facilitating device-to-device connection establishment, numerous other configurations may also be used to implement embodiments of the present invention.

In at least some embodiments, the system 100 includes one or more device-to-device registration server function (DRSF) apparatuses 102 and a plurality of terminal apparatuses 104. In at least some embodiments, the system 100 further comprises a network 106. The network 106 may comprise one or more wireline networks, one or more wireless networks, or some combination thereof. In one embodiment, the network 106 comprises a public land mobile network (for example, a cellular network), such as may be implemented by a network operator (for example, a cellular access provider). The network 106 may operate in accordance with universal terrestrial radio access network (UTRAN) standards, evolved UTRAN (E-UTRAN) standards, current and future implementations of Third Generation Partnership Project (3GPP) Long Term Evolution (LTE) (also referred to as LTE-A) standards, current and future implementations of International Telecommunications Union (ITU) International Mobile Telecommunications-Advanced (IMT-A) systems standards, and/or the like. It will be appreciated, however, that where references herein are made to a network standard and/or terminology particular to a network standard, the references are provided merely by way of example and not by way of limitation. Thus, for example, where terminology such as "evolved Node B" or "eNB" is used, it will be appreciated that, when appropriate, terminology such as "base station," "base transceiver station," "node B" and appropriate networking standards may be readily used in corresponding embodiments of the invention.

The terminal apparatuses 104 may be configured to communicate with at least one DRSF apparatus 102 over the network 106. In this regard, the DRSF apparatus 102 may comprise a node of the network 106. For example, in some embodiments, the DRSF apparatus 102 is at least partially embodied on one or more computing devices that comprise an element of a radio access network (RAN) portion of the network 106. In this regard, the DRSF apparatus 102 may, for example, be at least partially embodied on an access point of the network 106 (for example, a base station, base transceiver station (BTS), node B, evolved node B, and/or the like). Additionally or alternatively, the DRSF apparatus 102 may comprise one or more dedicated computing devices that comprise a portion of a RAN portion of the network 106. In some embodiments, the DRSF apparatus 102 is at least partially embodied on one or more computing devices that comprise a core network (CN) entity of the network 106. In this regard, the DRSF apparatus 102 may, for example, be at least partially embodied on a mobility management entity (MME) of the core network. Additionally or alternatively, the DRSF apparatus may comprise one or more dedicated computing devices that comprise a portion of a CN portion of the network 106. As a further example, in some embodiments, a DRSF apparatus 102 is embodied in a hierarchical structure being embodied on elements of both a RAN portion and a CN portion of the network 106. Regardless of where or how it is embodied, it will be appreciated that in some embodiments the DRSF apparatus 102 is embodied as a plurality of computing devices that collectively provide functionality attributed to the DRSF apparatus 102 herein.

In embodiments wherein the DRSF apparatus 102 is at least partially embodied as an access point, the DRSF apparatus 102 may be configured to provide access to a network (for example, cellular network) to one or more terminal apparatuses 104 via a radio uplink. In such embodiments, the network 106 may comprise one or more over-the-air radio links between the DRSF apparatus 102 and one or more terminal apparatuses 104. Such over-the-air radio links may be implemented in accordance with any appropriate wireless networking (for example, cellular networking) standard.

A terminal apparatus 104 may be configured with cognitive radio (CR) capabilities such that a terminal apparatus 104 may be configured to sense other terminal apparatuses 104 within a proximate range and detect whether sensed terminal apparatuses 104 are configured for device-to-device (D2D) communication. Accordingly, two or more terminal apparatuses 104 may, with the assistance of the DRSF apparatus 102 as will be described further herein, establish a D2D connection 108 with each other in order to engage in D2D communication with each other. A D2D connection 108 may, for example, comprise a direct radio link between two or more terminal apparatuses 104 and may enable the terminal apparatuses 104 engaged in D2D communication to communicate directly with each other without routing their communications via one or more elements of the network 106.

A terminal apparatus 104 may be embodied as a desktop computer, laptop computer, mobile terminal, mobile computer, mobile phone, mobile communication device, game device, digital camera/camcorder, audio/video player, television device, radio receiver, digital video recorder, positioning device, any combination thereof, and/or the like. In an example embodiment, the terminal apparatus 104 is embodied as a mobile terminal, such as that illustrated in FIG. 2.

Figure 2:
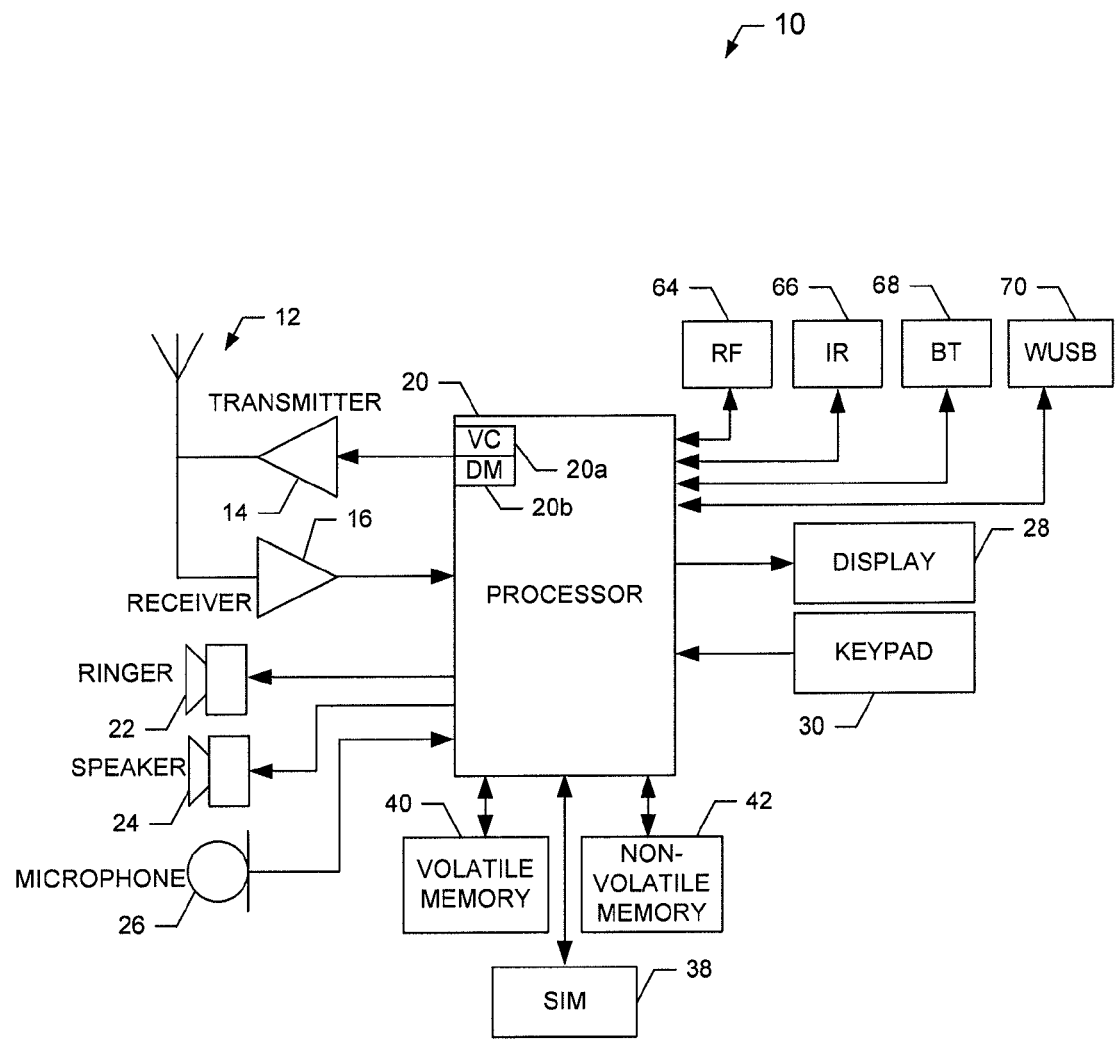
FIG. 2 is a schematic block diagram of a mobile terminal according to an example embodiment of the present invention.

In this regard, FIG. 2 illustrates a block diagram of a mobile terminal 10 representative of one embodiment of a terminal apparatus 104 in accordance with embodiments of the present invention. It should be understood, however, that the mobile terminal 10 illustrated and hereinafter described is merely illustrative of one type of terminal apparatus 104 that may implement and/or benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (for example, digital/analog or TDMA/CDMA/analog phones). Additionally, the mobile terminal 10 may be capable of operating according to Wireless Fidelity (Wi-Fi) or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (for example, Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, IEEE 802.15 techniques, IEEE 802.16 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 3:
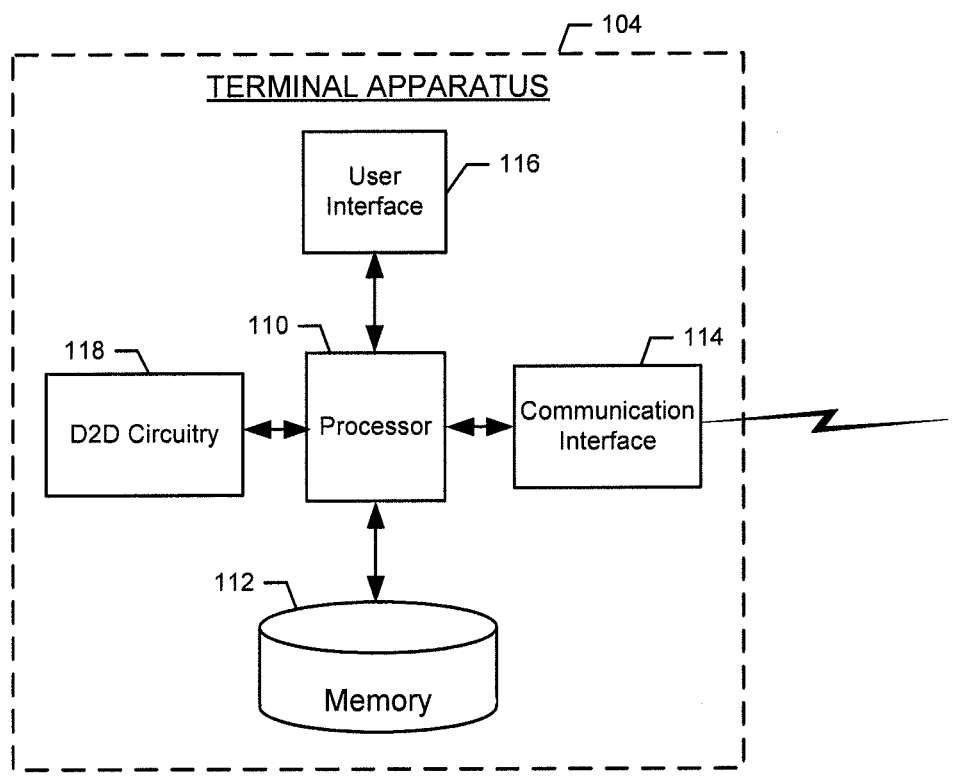
FIG. 3 illustrates a block diagram of a terminal apparatus for facilitating device-to-device connection establishment according to an example embodiment of the present invention.

FIG. 3 illustrates a block diagram of a terminal apparatus 104 for facilitating device-to-device connection establishment according to an example embodiment of the present invention. In the example embodiment illustrated in FIG. 3, the terminal apparatus 104 includes various means, such as a processor 110, memory 112, communication interface 114, user interface 116, and D2D (device-to-device) circuitry 118 for performing the various functions herein described. These means of the terminal apparatus 104 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example, memory 112) that is executable by a suitably configured processing device (for example, the processor 110), or some combination thereof.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 3 as a single processor, in some embodiments the processor 110 comprises a plurality of processors. The plurality of processors may be in operative communication with each other and may be collectively configured to perform one or more functionalities of the terminal apparatus 104 as described herein. In embodiments wherein the terminal apparatus 104 is embodied as a mobile terminal 10, the processor 110 may be embodied as or comprise the processor 20. In an example embodiment, the processor 110 is configured to execute instructions stored in the memory 112 or otherwise accessible to the processor 110. These instructions, when executed by the processor 110, may cause the terminal apparatus 104 to perform one or more of the functionalities of the terminal apparatus 104 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. Although illustrated in FIG. 3 as a single memory, the memory 112 may comprise a plurality of memories. In various embodiments, the memory 112 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the terminal apparatus 104 is embodied as a mobile terminal 10, the memory 112 may comprise the volatile memory 40 and/or the non-volatile memory 42. The memory 112 may be configured to store information, data, applications, instructions, or the like for enabling the terminal apparatus 104 to carry out various functions in accordance with example embodiments of the present invention. For example, in at least some embodiments, the memory 112 is configured to buffer input data for processing by the processor 110. Additionally or alternatively, in at least some embodiments, the memory 112 is configured to store program instructions for execution by the processor 110. The memory 112 may store information in the form of static and/or dynamic information. This stored information may be stored and/or used by D2D circuitry 118 during the course of performing its functionalities.

The communication interface 114 may be embodied as any device or means embodied in circuitry, hardware, a computer program product comprising computer readable program instructions stored on a computer readable medium (for example, the memory 112) and executed by a processing device (for example, the processor 110), or a combination thereof that is configured to receive and/or transmit data from/to an entity of the system 100, such as, for example, a DRSF apparatus 102 and/or another terminal apparatus 104. In at least one embodiment, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more entities of the system 100. The communication interface 114 may be configured to receive and/or transmit data using any protocol that may be used for communications between entities of the system 100. In this regard, the communication interface 114 may be configured to receive and/or transmit data using any protocol that may be used for transmission of data over the network 106 and/or over a D2D connection 108. The communication interface 114 may additionally be in communication with the memory 112, user interface 116, and/or D2D circuitry 118, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. The user interface 116 may be in communication with the memory 112, communication interface 114, and/or D2D circuitry 118, such as via a bus.

The D2D circuitry 118 may be embodied as various means, such as circuitry, hardware, a computer program product comprising computer readable program instructions stored on a computer readable medium (for example, the memory 112) and executed by a processing device (for example, the processor 110), or some combination thereof and, in one embodiment, is embodied as or otherwise controlled by the processor 110. In embodiments wherein the D2D circuitry 118 is embodied separately from the processor 110, the D2D circuitry 118 may be in communication with the processor 110. The D2D circuitry 118 may further be in communication with one or more of the memory 112, communication interface 114, or user interface 116, such as via a bus.

Figure 4:
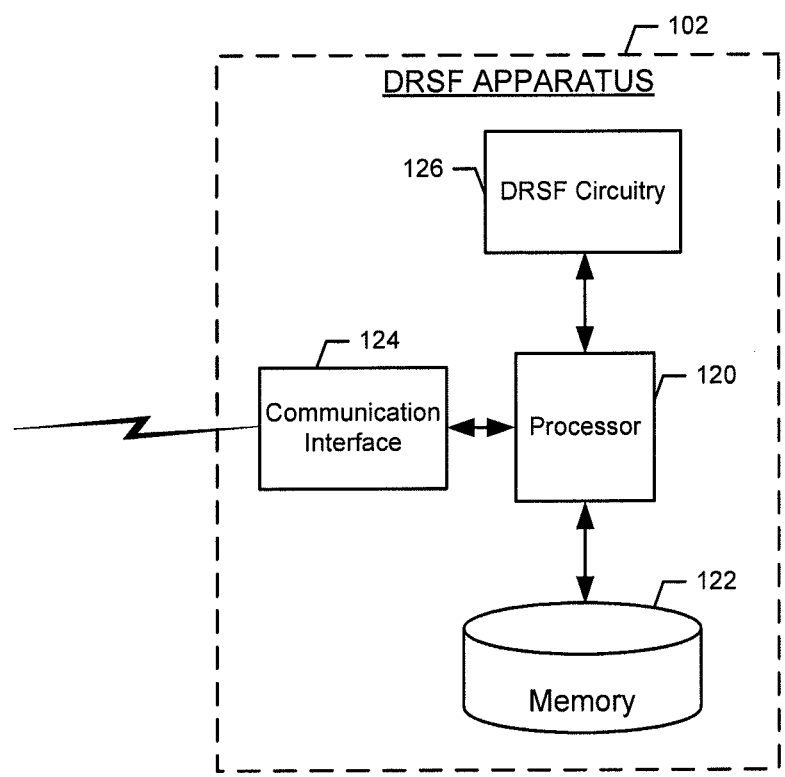
FIG. 4 illustrates a block diagram of a device-to-device registration server function (DRSF) apparatus for facilitating device-to-device connection establishment according to an example embodiment of the present invention.

FIG. 4 illustrates a block diagram of a DRSF apparatus 102 for facilitating device-to-device connection establishment according to an example embodiment of the present invention. In an example embodiment, the DRSF apparatus 102 includes various means, such as a processor 120, memory 122, communication interface 124, and DRSF circuitry 126 for performing the various functions herein described. These means of the DRSF apparatus 102 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example memory 122) that is executable by a suitably configured processing device (for example, the processor 120), or some combination thereof.

The processor 120 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 4 as a single processor, in some embodiments the processor 120 comprises a plurality of processors. The plurality of processors may be in operative communication with each other and may be collectively configured to perform one or more functionalities of the DRSF apparatus 102 as described herein. The plurality of processors may be embodied on a single computing device or may be distributed across a plurality of computing devices collectively configured to perform one or more functionalities of the DRSF apparatus 102 as described herein. In an example embodiment, the processor 120 is configured to execute instructions stored in the memory 122 or otherwise accessible to the processor 120. These instructions, when executed by the processor 120, may cause the DRSF apparatus 102 to perform one or more of the functionalities of the DRSF apparatus 102 as described herein. As such, whether configured by hardware or software methods, or by a combination thereof, the processor 120 may comprise an entity capable of performing operations according to embodiments of the present invention while configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, such as may be stored in the memory 122, the instructions may specifically configure the processor 120 to perform one or more algorithms and operations described herein.

The memory 122 may comprise, for example, volatile memory, non-volatile memory, or some combination thereof. Although illustrated in FIG. 4 as a single memory, the memory 122 may comprise a plurality of memories. The plurality of memories may be embodied on a single computing device or distributed across a plurality of computing devices. In various embodiments, the memory 112 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 122 may be configured to store information, data, applications, instructions, or the like for enabling the DRSF apparatus 102 to carry out various functions in accordance with example embodiments of the present invention. For example, in at least some embodiments, the memory 122 is configured to buffer input data for processing by the processor 120. Additionally or alternatively, in at least some embodiments, the memory 122 is configured to store program instructions for execution by the processor 120. The memory 122 may store information in the form of static and/or dynamic information. This stored information may comprise, for example, a registration database storing one or more mappings. A stored mapping may comprise a mapping (for example, a defined association) between a D2D user identifier and a network-allocated identifier for a terminal apparatus 104. This stored information may be stored and/or used by the DRSF circuitry 126 during the course of performing its functionalities.

The communication interface 124 may be embodied as any device or means embodied in circuitry, hardware, a computer program product comprising computer readable program instructions stored on a computer readable medium (for example, the memory 122) and executed by a processing device (for example, the processor 120), or a combination thereof that is configured to receive and/or transmit data from/to an entity of the system 100, such as, for example, a terminal apparatus 104. In at least one embodiment, the communication interface 124 is at least partially embodied as or otherwise controlled by the processor 120. In this regard, the communication interface 124 may be in communication with the processor 120, such as via a bus. The communication interface 124 may include, for example, an antenna, a transmitter, a receiver, a transceiver and/or supporting hardware or software for enabling communications with one or more entities of the system 100. The communication interface 124 may be configured to receive and/or transmit data using any protocol that may be used for communications between entities of the system 100. In this regard, the communication interface 124 may be configured to receive and/or transmit data using any protocol that may be used for transmission of data over the network 106. The communication interface 124 may additionally be in communication with the memory 122 and/or DRSF circuitry 126, such as via a bus.

The DRSF circuitry 126 may be embodied as various means, such as circuitry, hardware, a computer program product comprising computer readable program instructions stored on a computer readable medium (for example, the memory 122) and executed by a processing device (for example, the processor 120), or some combination thereof and, in one embodiment, is embodied as or otherwise controlled by the processor 120. In embodiments wherein the DRSF circuitry 126 is embodied separately from the processor 120, the DRSF circuitry 126 may be in communication with the processor 120. The DRSF circuitry 126 may further be in communication with one or more of the memory 122 or communication interface 124, such as via a bus.

In at least some embodiments, a DRSF apparatus 102 is configured to manage D2D registration for a predefined D2D registration area. In this regard, a network, such as a cellular network, may be configured by a network operator to include a plurality of DRSF apparatuses 102, each of which is configured to manage a predefined D2D registration area. It will be appreciated, that in some embodiments, multiple DRSF apparatuses 102 may collectively manage a single D2D registration area. Each D2D registration area may be assigned a D2D registration area identification. A D2D registration area identification for a given D2D registration area may not necessarily be unique network wide, but in an example embodiment, is unique at least among a group of D2D registration areas comprising the D2D registration area and any neighboring D2D registration areas. In this regard, a terminal apparatus 104 that receives an indication of a D2D registration area identification for a cell in which the terminal apparatus 104 is currently located may determine whether it has transitioned into a new D2D registration area based on any detected change in D2D registration area identification. It will be appreciated that with respect to neighboring D2D registration areas, the neighboring D2D registration areas may not necessarily have discrete boundaries between each other and a coverage area of one D2D registration area may overlap a coverage area of a second D2D registration area.

In some embodiments, the DRSF apparatus 102 is implemented as a centralized entity in a RAN element. In such embodiments, the D2D registration area is limited to a control area of the RAN element. For example, if the DRSF apparatus 102 is embodied on an evolved Node B, the D2D registration area may be defined as the cell(s) controlled by the evolved Node B. Such embodiments may result in quicker D2D connection setup time, as fewer network entities may be involved in the D2D connection setup procedures and thus signaling between network entities during a D2D connection setup procedure may be reduced.

In other embodiments, the DRSF apparatus 102 is implemented as a distributed entity over a plurality of RAN elements. In such embodiments, the D2D registration area may be extended into the coverage area controlled by the plurality of RAN elements over which the DRSF apparatus 102 is distributed. For example, if the DRSF apparatus is distributed over a plurality of evolved Node Bs, the D2D registration area may be defined as the cells controlled by the plurality of evolved Node Bs. During D2D registration procedures and D2D related control procedures (for example, D2D connection setup, D2D paging, and/or the like), the distributed RAN elements comprising the distributed DRSF apparatus 102 may communicate with each other over an interface between the RAN elements, such as, for example, the X2 interface in E-UTRAN networks. Such embodiments may result in less frequent D2D registration by a terminal apparatus 104, as the D2D registration area may be larger than the D2D registration area for embodiments wherein the DRSF apparatus 102 is centralized in a single RAN element.

In embodiments wherein the DRSF apparatus 102 is located in the core network, the D2D registration area may be aligned with an area under control of a core network entity, such as, for example, an MME. For example, the D2D registration area in such embodiments may be aligned with the tracking area of a cellular network controlled or otherwise managed by the core network.

In embodiments wherein the DRSF apparatus 102 has a hierarchical implementation that is distributed between RAN and core network elements, the portion of the DRSF apparatus 102 that is embodied in the RAN may be configured for managing the terminal apparatuses 102 that are in a cellular active state. The portion of the DRSF apparatus 102 that is embodied in the core network may be configured to manage terminal apparatuses 102 that are in cellular idle state or, alternatively, may be configured to manage all terminal apparatuses 102 regardless of whether in cellular active state or cellular idle state. In such embodiments, the D2D registration procedure as further described below may be incorporated into a handover procedure to reduce any signaling overhead introduced by frequent D2D registration while also shortening D2D connection setup time as in embodiments wherein the DRSF apparatus 102 is embodied as a centralized entity in a RAN element.

In some embodiments, the DRSF circuitry 126 is configured to direct transmission of an indication of the D2D registration area identification for the D2D area which the DRSF apparatus 102 is configured to manage. For example, the DRSF circuitry 126 may be configured to direct transmission by directing broadcast, such as, for example, over a broadcast channel (BCCH), of an indication of the D2D registration area identification. In some embodiments, the DRSF circuitry 126 may cause the DRSF apparatus 102 to transmit (for example, broadcast) an indication of the D2D registration area identification, for example, via the communication interface 124. Alternatively, the DRSF circuitry 126 may direct one or more other apparatuses, such as network access point(s) (for example, evolved Node B(s)) to transmit (for example, broadcast) the D2D registration area identification. For example, the DRSF circuitry 126 may be configured to direct one or more apparatuses to transmit (for example, broadcast) the D2D registration area information using an S1 interface and appropriate protocol (for example, application protocol), S1-like interface and appropriate protocol, or the like. Regardless of what entity ultimately broadcasts the D2D registration area identification, in an example embodiment, the DRSF circuitry 126 is configured to cause the D2D registration area identification for the D2D registration area to be broadcast in each of one or more cells that comprise the D2D registration area identified by the D2D registration area identification. In some embodiments, the D2D registration area identification may comprise a few bits of data that the DRSF circuitry 126 may cause to be broadcast over a BCCH as broadcast system information.

The D2D circuitry 118 of a terminal apparatus 104 is configured in some embodiments to direct receipt of a transmitted (for example, broadcast) D2D registration area identification. The D2D circuitry 118 may be configured to determine whether the received D2D registration area identification indicates that the terminal apparatus 104 has entered a new D2D registration area. In this regard, the D2D circuitry 118 may, for example, be configured to direct storage of a last known D2D registration area identification in the memory 112. The D2D circuitry 118 may then determine whether the terminal apparatus 104 has entered a new D2D registration area by comparing the received D2D registration area identification to the last known D2D registration area identification to determine whether the received D2D registration area identification is different from the last known D2D registration area identification. The D2D circuitry 118 may be configured to determine that the terminal apparatus 104 has entered a new D2D registration area when the two D2D registration area identifications are different.

In response to determining that the terminal apparatus 104 has entered a new D2D registration area and/or if the terminal apparatus 104 plans to use D2D communication services but has not previously registered, the D2D circuitry 118 may be configured to generate a D2D registration request for transmission toward the DRSF apparatus 102. Depending on the configuration of the system 100, the D2D circuitry 118 may be configured to cause the D2D registration request to be transmitted directly to the DRSF apparatus 102 and/or may be configured to cause the D2D registration request to be transmitted to some other network node that may then relay the request toward the DRSF apparatus 102.

The D2D registration request may comprise an indication of a D2D user identifier for the terminal apparatus 104 and a network-allocated identifier for the terminal apparatus 104. The D2D user identifier may comprise, for example, a number, nickname, e-mail address, numeric string, character string, alphanumeric string, and/or the like. The D2D user identifier may be allocated by a network/network operator, by a user of the terminal apparatus 104, preconfigured by a manufacturer of the terminal apparatus 104, and/or the like. In the event that the D2D user identifier is not allocated by the network/network operator, the D2D user identifier may include a prefix or suffix added to the base D2D user identifier by the network to facilitate differentiation of the D2D user identifier in the event that another terminal apparatus has the same base D2D user identifier.

The network-allocated identifier included in the D2D registration request may comprise any network-allocated identifier that a network element, such as the DRSF apparatus 102, may use to authenticate the terminal apparatus 104. In this regard, the terminal apparatus 104 may advertise its D2D user identifier to other terminal apparatuses to facilitate D2D connection establishment. Accordingly, the D2D user identifier may be known to other terminal apparatuses and thus may not comprise a sufficient secure identification of the terminal apparatus 104 for authentication purposes. In some embodiments, this network-allocated identifier comprises a temporary network-allocated identifier, such as, for example, S-TMSI (S-Temporary Mobile Subscriber Identity), as by such embodiments, normal registration and authentication to the cellular network (for example, to the network 106) is performed prior to D2D registration.

The DRSF circuitry 126 is configured in some embodiments to direct receipt by the DRSF apparatus 102 of a D2D registration request originated by the terminal apparatus 104. In this regard, the DRSF apparatus 102 may be configured to receive a D2D registration request directly from a terminal apparatus 104 and/or indirectly via one or more intermediate network nodes. The DRSF circuitry 126 may be configured to extract the network-allocated identifier from the D2D registration request and use the extracted network-allocated identifier for authentication of the terminal apparatus 104. The authentication may be carried out by the DRSF circuitry 126 and/or by an appropriate network authentication entity in response to an authentication request from the DRSF apparatus 102. During authentication, the terminal apparatus 104 may be allocated an updated network-allocated identifier. It will be appreciated that in some embodiments of the invention, the authentication procedures described above are not required to be performed and thus the authentication procedures may not be performed in response to every D2D registration request and/or in all embodiments of the invention.

The DRSF circuitry 126 may be further configured to generate a mapping between the D2D user identifier included in the D2D registration request and a current network-allocated identifier for the terminal apparatus 104. The current network-allocated identifier may comprise the network-allocated identifier included in the D2D registration request or may comprise an updated network-allocated identifier allocated to the terminal apparatus 104 subsequent to the D2D registration request. The DRSF circuitry 126 may additionally be configured to direct storage of a generated mapping in the memory 122, such as in a D2D registration database stored in the memory 122. Subsequent to registration of the terminal apparatus 104, the DRSF circuitry 126 may be configured to cause a D2D registration response to be transmitted to the terminal apparatus 104. The D2D registration response may comprise an updated network-allocated identifier (for example, an updated S-TMSI). In this regard, the network-allocated identifier may be updated in some embodiments in accordance with network policy. For example, the network-allocated identifier may be updated when the terminal apparatus 104 moves to a new tracking area, when moves to an area handled by a different MME than handled a previous area in which the terminal apparatus 104 was located, in accordance with a periodic update policy, and/or in accordance with any other network-implemented policy. The D2D registration response may further comprise the D2D user identifier for the terminal apparatus 104. If the DRSF circuitry 126 has modified the D2D user identifier, such as by adding a prefix or suffix to distinguish the D2D user identifier from another D2D user identifier stored in the D2D registration database, this modification may be indicated through inclusion of the modified D2D user identifier in the D2D registration response.

The D2D circuitry 118 may be configured to direct receipt by the terminal apparatus 104 of a D2D registration response. Following receipt of a D2D registration response indicating a successful D2D registration, the D2D circuitry 118 may be configured to cause the D2D user identifier for the terminal apparatus 104 to be broadcast or otherwise transmitted such that other CR and D2D capable devices may detect the presence of the terminal apparatus 104 for possible D2D communication. The broadcasted D2D user identifier may be open to all devices configured for CR and D2D or may be closed to a defined user group (for example, to a group of "friends" or trusted devices defined by the user of the terminal apparatus 104). If the D2D user identifier is broadcasted only to a closed group, a network entity, such as the DRSF apparatus 102, may be configured to provide the group of users with a common ciphering/deciphering key. The D2D circuitry 118 may use the ciphering/deciphering key to encrypt the broadcast D2D user identifier and the devices of the closed group may use the ciphering/deciphering key to decrypt and detect the broadcast D2D user identifier.

Depending on how the DRSF apparatus 102 is embodied and how the corresponding D2D registration area is defined, the foregoing registration procedure may be incorporated into various network procedures. In some embodiments, the registration procedure may comprise a stand-alone procedure and the terminal apparatus 104 may transmit a D2D registration request as a stand-alone procedure/message when the terminal apparatus 104 wishes to register for D2D communication services. In embodiments wherein the DRSF apparatus 102 is at least partially embodied on a RAN element (for example, on an evolved Node B), the registration procedure may comprise a part of a handover procedure. Accordingly, the D2D registration request may be transmitted as a portion of a handover message and/or as a stand-alone message transmitted during a handover procedure. In embodiments wherein a D2D registration area is defined as a tracking area (for example, embodiments wherein the DRSF apparatus 102 is embodied on a core network element), the D2D registration procedure may be incorporated into a location/tracking area update procedure. Accordingly, the D2D registration request may be transmitted as a portion of a location/tracking area update message and/or as a stand-alone message transmitted during a location/tracking area update procedure.

The D2D circuitry 118 may be further configured with CR capabilities. In this regard, the D2D circuitry 118 may be configured to detect the presence of a second terminal apparatus that is D2D capable in proximity to the terminal apparatus 104. For example, the D2D circuitry 118 may receive or otherwise detect a D2D user identifier for the second terminal apparatus that is broadcast by the second terminal apparatus. The D2D circuitry 118 may subsequently (for example, at the behest of a user-initiated connection establishment request) generate a D2D connection establishment request to establish a D2D connection with the second terminal apparatus. The D2D connection establishment request may include the D2D user identifier for the second terminal apparatus. The D2D circuitry 118 may further cause the D2D connection establishment request to be transmitted toward the DRSF apparatus 102.

The DRSF circuitry 126 is configured in some embodiments to direct receipt of a D2D connection establishment request originated by a terminal apparatus 104. After receiving the D2D connection establishment request, the DRSF circuitry 126 may be configured to extract the D2D user identifier for the second terminal apparatus from the D2D connection establishment request. The DRSF circuitry 126 may be further configured to use the extracted D2D user identifier to derive a corresponding network-allocated identifier, such as, for example, the S-TMSI, for the second terminal apparatus. In this regard, DRSF circuitry 126 may be configured to look for a stored mapping in a D2D registration database stored in the memory 122. If the mapping is not stored in the D2D registration database, the DRSF circuitry 126 may be configured to communicate with DRSF apparatuses 102 responsible for neighboring D2D registration areas to derive a network-allocated identifier for the second terminal apparatus. In this regard, the second terminal apparatus may be within a proximate range of the terminal apparatus 104, but may be located in a neighboring D2D registration area. After deriving the network-allocated identifier for the second terminal apparatus, the DRSF circuitry 126 may direct paging the second terminal apparatus to facilitate establishment of a D2D connection between the terminal apparatus 104 and the second terminal apparatus.

In some embodiments, the DRSF circuitry 126 is configured to determine a paging area in which to page the second terminal apparatus so as to limit the area in which the second terminal apparatus is paged to conserve network resources. For example, the DRSF circuitry 126 may be configured to determine a paging area based at least in part upon the D2D connection establishment request originated by the terminal apparatus 104. In this regard, the DRSF circuitry 126 may be configured to determine a cell (for example, an identity of an access point) by which the D2D connection establishment request was received by the network. The DRSF circuitry 126 may then define the paging area to comprise the determined cell. The DRSF circuitry 126 may further define the paging area to comprise cells neighboring the determined cell and/or cells within the D2D registration area in which the second terminal apparatus registered. In this regard, the second terminal apparatus may be proximate to the terminal apparatus 104 and thus may be assumed to be located either in the same cell as the terminal apparatus 104 or in a neighboring cell. In embodiments wherein the DRSF circuitry 126 determines a paging area, the DRSF circuitry 126 may be configured to page the second terminal apparatus only in the determined paging area.

The DRSF circuitry 126 may be additionally configured to allocate a subset of available network resources for a D2D connection. These allocated resources may comprise, for example, an allocated channel, allocated data rate, maximum allocated transmit power (for example, to limit the possibility of the D2D connection interfering with in-band cellular communications), allocated period of time for using allocated resources, and/or the like. The DRSF circuitry 126 may be configured to generate a resource allocation token specifying the allocated resources. The token may be specified with an incremental accounting index (for example, 1, 2, 3, . . . ), a maximum duration (for example, 2 minutes), a guarding timer, and/or the like to define a time-limitation for the resource allocation indicated by the token. The DRSF circuitry 126 may also be configured to provide the token to at least one of the terminal apparatuses that is party to the D2D connection. For example, the DRSF circuitry 126 may include a resource allocation token in a D2D connection establishment response that may be sent to a terminal apparatus 104 in response to a D2D connection establishment request.

Since resource allocation may be time limited and usage of a D2D connection may last longer than a period for which resources have been allocated, embodiments of the invention provide a token refreshing procedure. The token refreshing procedure may be initiated by the terminal apparatus (for example, by the D2D circuitry 118), by the DRSF apparatus 102 (for example, by the DRSF circuitry 126), or by a combination thereof. In some embodiments, a token refresh procedure may be triggered by the time-limitation specified in the resource allocation token. For example, as the time limitation is nearing expiration or after the time limitation has expired, the D2D circuitry 118 and/or DRSF circuitry 126 may be configured to initiate a token refresh procedure. The token refreshing procedure may be realized using, for example, L1 PHY signaling, L2 MAC (medium access control) signaling, L3 RRC (radio resource control) signaling, and/or the like.

It will be appreciated that in some situations, network conditions may change following resource allocation, but before the expiration of a period for which resources have been allocated to a D2D connection. Accordingly, the DRSF circuitry 126 may be configured to revoke and/or replace a resource allocation token so as to adapt resource allocation as network conditions dictate.

Figure 5:
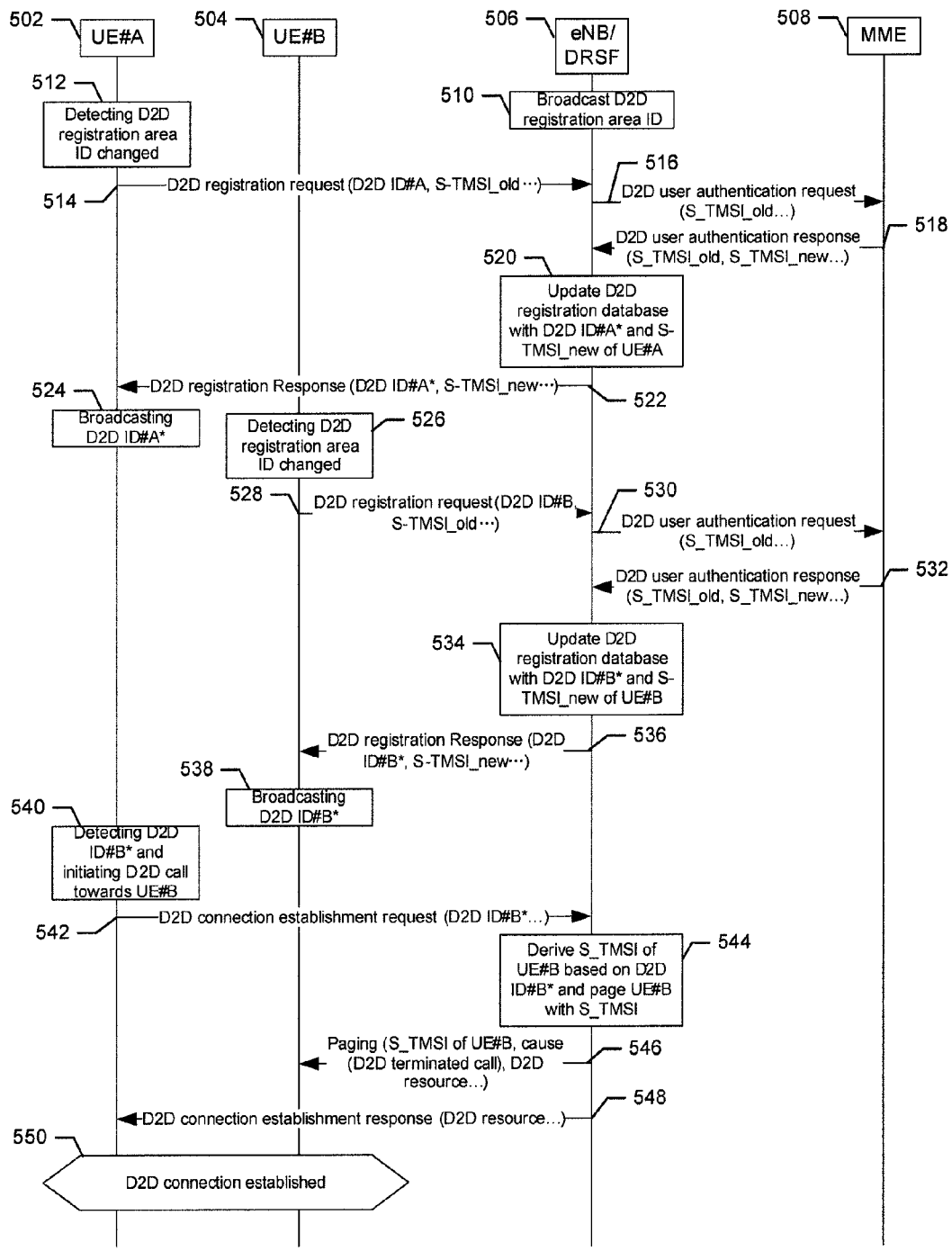
FIG. 5 illustrates a signaling diagram of signals that may be exchanged between entities configured according to a method for facilitating device-to-device connection establishment in accordance with an example embodiment of the invention.

FIG. 5 illustrates a signaling diagram of signals that may be exchanged between entities configured according to a method for facilitating device-to-device connection establishment in accordance with an example embodiment of the invention. In this regard, FIG. 5 illustrates a signaling diagram of signals that may be exchanged between entities of a cellular network operating in accordance with LTE-A standards when the DRSF apparatus 102 is embodied in a RAN element, such as an evolved Node B (eNB). The cellular network of the embodiment illustrated in FIG. 5 comprises a UE#A (user equipment #A) 502, UE#B (user equipment #B) 504, eNB/DRSF 506, and MME 508. The UE#A 502 and UE#B 504 may each comprise an embodiment of a terminal apparatus 104. Accordingly, operations illustrated in FIG. 5 to be performed by the UE#A 502 and UE#B 504 may, for example, be performed by and/or under the direction of D2D circuitry 118. The eNB/DRSF 506 may comprise an embodiment of a DRSF apparatus 102. Accordingly, operations illustrated in FIG. 5 to be performed by the eNB/DRSF 506 may, for example, be performed by and/or under the direction of DRSF circuitry 126.

Operation 510 may comprise the eNB/DRSF 506 broadcasting it's D2D registration area identification. Operation 512 may comprise the UE#A 502 detecting it has entered a new D2D registration area by detecting a change in the D2D registration area identification. Operation 514 may comprise the UE#A 502 originating a D2D registration request comprising a D2D user identifier for the UE#A 502 (D2D ID#A) and a network-allocated identifier for the UE#A 502 (S-TMSI_old) and transmitting the D2D registration request toward the eNB/DRSF 506. Operation 516 may comprise the eNB/DRSF 506 sending a D2D user authentication request comprising the S-TMSI_old to the MME 508. The MME 508 may then authenticate the UE#A 502 using S-TMSI_old and update the network-allocated identifier to S-TMSI_new. Operation 518 may then comprise the MME 508 sending a D2D user authentication response comprising S-TMSI_new to the enNB/DRSF 506.

Operation 520 may comprise the eNB/DRSF 506 updating a D2D registration database by storing a mapping between D2D ID#A and S-TMSI_new. Prior to storing the mapping, the eNB/DRSF 506 may update the D2D ID#A, for example, by adding a prefix or suffix to D2D ID#A to distinguish it from any identical D2D user identifier. This updated D2D ID#A is designated D2D ID#A*. Operation 522 may comprise the eNB/DRSF 506 transmitting a D2D registration Response comprising D2D ID#A* and S-TMSI_new toward UE#A 502. Operation 524 may comprise the UE#A 502 broadcasting its D2D user identifier such that other UEs may detect the broadcast D2D user identifier.

Operation 526 may comprise the UE#B 504 detecting it has entered a new D2D registration area by detecting a change in the D2D registration area identification. Operation 528 may comprise the UE#B 504 originating a D2D registration request comprising a D2D user identifier for the UE#B 504 (D2D ID#B) and a network-allocated identifier for the UE#B 504 (S-TMSI_old) and transmitting the D2D registration request toward the eNB/DRSF 506. Operation 530 may comprise the eNB/DRSF 506 sending a D2D user authentication request comprising the S-TMSI_old to the MME 508. The MME 508 may then authenticate the UE#B 504 using S-TMSI_old and update the network-allocated identifier to S-TMSI_new. Operation 532 may then comprise the MME 508 sending a D2D user authentication response comprising S-TMSI_new to the eNB/DRSF 506.

Operation 534 may comprise the eNB/DRSF 506 updating a D2D registration database by storing a mapping between D2D ID#B and S-TMSI_new. Prior to storing the mapping, the eNB/DRSF 506 may update the D2D ID#B, for example, by adding a prefix or suffix to D2D ID#B to distinguish it from any identical D2D user identifier. This updated D2D ID#B is designated D2D ID#B*. Operation 536 may comprise the eNB/DRSF 506 transmitting a D2D registration Response comprising D2D ID#B* and S-TMSI_new toward UE#B 504. Operation 538 may comprise the UE#B 504 broadcasting its D2D user identifier such that other UEs may detect the broadcast D2D user identifier.

The UE#A 502 may detect the D2D user identifier broadcast by UE#B and initiate a D2D call towards UE#B 504, at operation 540. Operation 542 may comprise UE#A 502 originating a D2D connection establishment request comprising the detected D2D user identifier for UE#B 504 and causing the D2D connection establishment request to be transmitted toward the eNB/DRSF 506. Operation 544 may comprise the eNB/DRSF 506 extracting the D2D user identifier for UE#B 504 from the D2D connection establishment request and deriving the network-allocated identifier for UE#B 504 based on the mapping stored in the D2D registration database. The eNB/DRSF 506 may then use the derived network-allocated identifier for UE#B 504 to page UE#B 504, at operation 546.

Operation 548 may comprise the eNB/DRSF 506 transmitting a D2D connection establishment response including a D2D resource allocation token toward UE#A 502. Operation 550 may comprise UE#A 502 and UE#B 504 using the resources allocated by the resource allocation token to establish a D2D connection.

Figure 6:
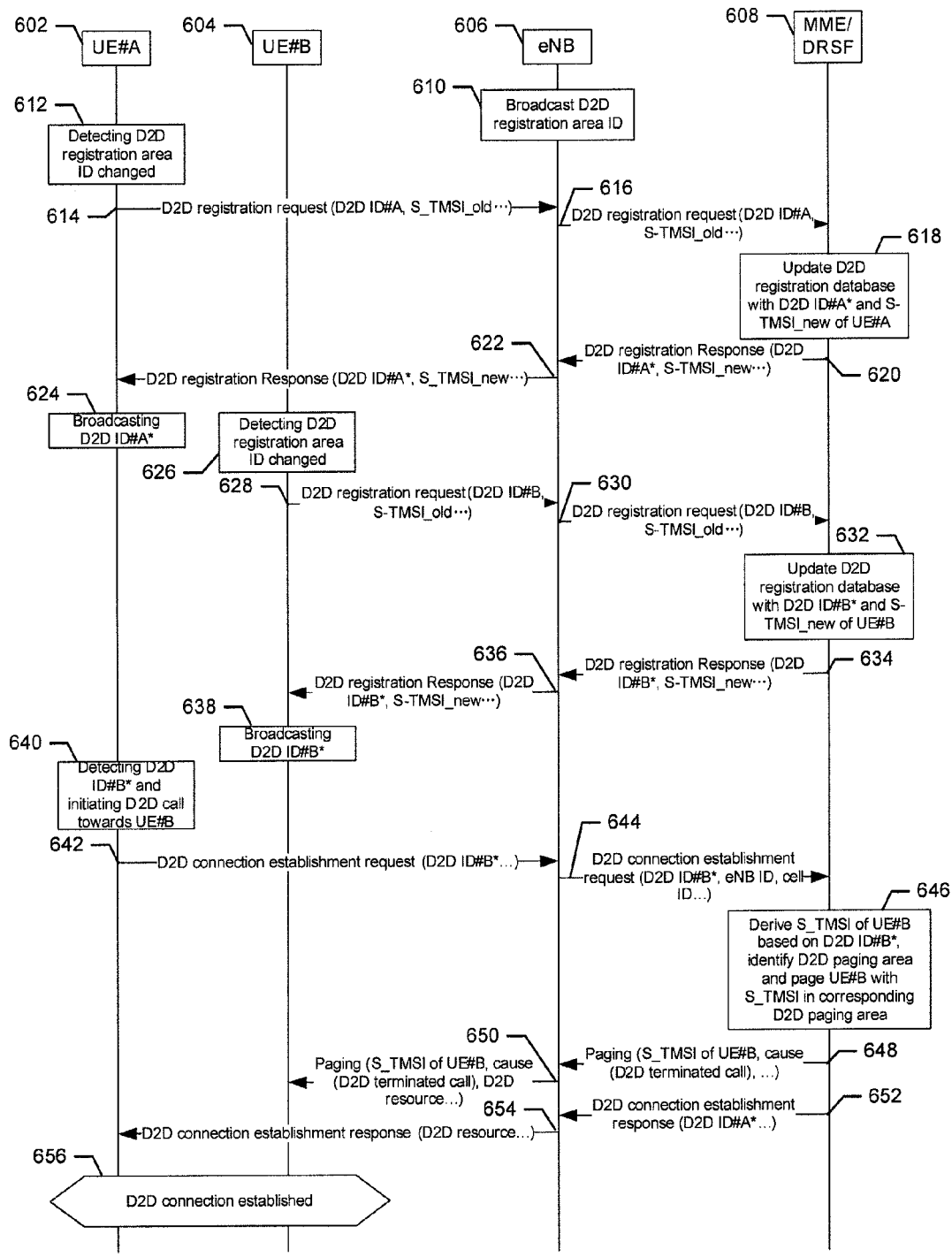
FIG. 6 illustrates a signaling diagram of signals that may be exchanged between entities configured according to a method for facilitating device-to-device connection establishment in accordance with an example embodiment of the invention.

FIG. 6 illustrates a signaling diagram of signals that may be exchanged between entities configured according to a method for facilitating device-to-device connection establishment in accordance with an example embodiment of the invention. In this regard, FIG. 6 illustrates a signaling diagram of signals that may be exchanged between entities of a cellular network operating in accordance with LTE-A standards when the DRSF apparatus 102 is embodied in a core network element, such as an MME. The cellular network of the embodiment illustrated in FIG. 6 comprises a UE#A (user equipment #A) 602, UE#B (user equipment #B) 604, eNB 606, and MME/DRSF 608. The UE#A 602 and UE#B 604 may each comprise an embodiment of a terminal apparatus 104. Accordingly, operations illustrated in FIG. 6 to be performed by the UE#A 602 and UE#B 604 may, for example, be performed by and/or under the direction of D2D circuitry 118. The MME/DRSF 608 may comprise an embodiment of a DRSF apparatus 102. Accordingly, operations illustrated in FIG. 6 to be performed by the MME/DRSF 608 may, for example, be performed by and/or under the direction of DRSF circuitry 126.

Operation 610 may comprise the eNB 506 broadcasting the D2D registration area identification for the DRSF embodied on the MME/DRSF 608 (for example, under the direction of the MME/DRSF 608). Operation 612 may comprise the UE#A 602 detecting it has entered a new D2D registration area by detecting a change in the D2D registration area identification. Operation 614 may comprise the UE#A 602 originating a D2D registration request comprising a D2D user identifier for the UE#A 602 (D2D ID#A) and a network-allocated identifier for the UE#A 602 (S-TMSI_old) and transmitting the D2D registration request toward the MME/DRSF 608. Operation 616 may comprise the eNB 606 forwarding the D2D registration request originated by the UE#A 602 to the MME/DRSF 608. The MME/DRSF 608 may authenticate the UE#A 602 using S-TMSI_old and update the network-allocated identifier to S-TMSI_new. Operation 618 may comprise the MME/DRSF 608 updating a D2D registration database by storing a mapping between D2D ID#A and S-TMSInew. Prior to storing the mapping, the MME/DRSF 608 may update the D2D ID#A, for example, by adding a prefix or suffix to D2D ID#A to distinguish it from any identical D2D user identifier. This updated D2D ID#A is designated D2D ID#A*.

Operation 620 may comprise the MME/DRSF 608 transmitting a D2D registration response comprising D2D ID#A* and S-TMSI_new toward UE#A 602. Operation 622 may comprise the eNB 606 forwarding the D2D registration response to the UE#A 602. Operation 624 may comprise the UE#A 602 broadcasting its D2D user identifier such that other UEs may detect the broadcast D2D user identifier.

Operation 626 may comprise the UE#B 604 detecting it has entered a new D2D registration area by detecting a change in the D2D registration area identification. Operation 628 may comprise the UE#B 604 originating a D2D registration request comprising a D2D user identifier for the UE#B 604 (D2D ID#B) and a network-allocated identifier for the UE#B 604 (S-TMSI_old) and transmitting the D2D registration request toward the MME/DRSF 608. Operation 630 may comprise the eNB 606 forwarding the D2D registration request originated by the UE#B 604 to the MME/DRSF 608. The MME/DRSF 608 may authenticate the UE#B 604 using S-TMSI_old and update the network-allocated identifier to S-TMSI_new. Operation 632 may comprise the MME/DRSF 608 updating a D2D registration database by storing a mapping between D2D ID#B and S-TMSI_new. Prior to storing the mapping, the MME/DRSF 608 may update the D2D ID#B, for example, by adding a prefix or suffix to D2D ID#B to distinguish it from any identical D2D user identifier. This updated D2D ID#B is designated D2D ID#B*.

Operation 634 may comprise the MME/DRSF 608 transmitting a D2D registration response comprising D2D ID#B* and S-TMSI_new toward UE#B 604. Operation 636 may comprise the eNB 606 forwarding the D2D registration response to the UE#B 604. Operation 638 may comprise the UE#B 604 broadcasting its D2D user identifier such that other UEs may detect the broadcast D2D user identifier.

The UE#A 602 may detect the D2D user identifier broadcast by UE#B 604 and initiate a D2D call towards UE#B 604, at operation 640. Operation 642 may comprise UE#A 602 originating a D2D connection establishment request comprising the detected D2D user identifier for UE#B 604 and causing the D2D connection establishment request to be transmitted toward the MME/DRSF 608. The eNB 606 may forward the D2D connection establishment request to the MME/DRSF 608, at operation 644. The eNB 606 may add an indication of an identification (cell ID) of the cell by which the D2D connection establishment request was received to the D2D connection establishment request such that the MME/DRSF 608 may determine an appropriate paging area.

Operation 646 may comprise the MME/DRSF 608 extracting the D2D user identifier for UE#B 604 from the D2D connection establishment request and deriving the network-allocated identifier for UE#B 604 based on the mapping stored in the D2D registration database. Operation 646 may further comprise the MME/DRSF 608 determining a paging area based at least in part upon the cell ID included in the D2D connection establishment request by the eNB 606. In this regard, the MME/DRSF 608 may define the paging area to include the cell by which the eNB 606 received the D2D connection establishment request originated by the UE#A 602. The MME/DRSF 608 may further define the paging area to include cells neighboring the cell by which the eNB 606 received the D2D connection establishment request originated by the UE#A 602 and/or cells within the D2D registration area in which the UE#B 604 registered. Operation 646 may additionally comprise the MME/DRSF 608 using the derived network-allocated identifier for UE#B 604 to direct paging of the UE#B 604 in the determined paging area, at operation 648. Operation 650 may comprise the eNB 606 forwarding the page for UE#B 604 such that paging occurs in the determined paging area.

Operation 652 may comprise the MME/DRSF 608 transmitting a D2D connection establishment response including a D2D resource allocation token toward UE#A 602. The eNB 606 may forward the D2D connection establishment response to the UE#A, at operation 654. Operation 656 may comprise UE#A 602 and UE#B 604 using the resources allocated by the resource allocation token to establish a D2D connection.

In some embodiments, D2D registration area IDs are not used. Such embodiments may be utilized, for example, in systems wherein at least some terminal apparatuses are not configured for cognitive radio capabilities. In such embodiments, the DRSF circuitry 126 may be configured to maintain a D2D registration database in the memory 122. The D2D registration database may store one or more D2D user name mappings. A D2D user name mapping may comprise a mapping between one or more network-allocated identifiers for a terminal apparatus 104 and a D2D user name. The one or more network-allocated identifiers may comprise, for example, a TMSI and/or an S-TMSI for a terminal apparatus 104.

The DRSF circuitry 126 may be configured to derive a D2D user name mapping based at least in part upon a registration of a terminal apparatus 104 to the network 106 for D2D usage. The registration of a terminal apparatus 104 to the network 106 for D2D usage may comprise a two part registration. The first part of the registration may comprise a service/application layer registration. The DRSF circuitry 126 may be configured to use the service/application layer registration to derive a mapping between a D2D user identifier and a user mobile number (for example, IMSI (International Mobile Subscriber Identity)) or other permanent network-allocated identifier for a terminal apparatus 104. For example, service/application layer registration may comprise a network operator configured registration (for example, when a user subscribes to a service provided by the network operator) by which the network operator assigns a D2D user identifier to a permanent network-allocated identifier for the terminal apparatus 104. In another example, the service/application layer registration may comprise user registration via a website, wherein the user may register for D2D services and supply a D2D user name that may be bound to a permanent network-allocated identifier (for example, a mobile number or IMSI) for the user's terminal apparatus 104.

A second part to the registration of a terminal apparatus 104 may comprise a registration to the network 106 upon accessing the network 106. This registration may be managed by a core network element, such as, for example, an MME. In this regard, the core network element managing the registration may be configured to allocate an RNTI (Radio Network Temporary Identifier) if the registration comprises an initial access registration and/or allocate an updated RNTI when, for example, the terminal apparatus 104 is in an idle state. The core network element may then configure a mapping between a permanent network-allocated identifier (for example, IMSI) for the terminal apparatus 104 and a temporary network-allocated identifier (for example, S-TMSI) for the terminal apparatus 104. Based on this mapping configured by the core network element, the DRSF circuitry 126 may be configured to derive a mapping between the D2D user identifier and temporary network-allocated identifier based on the permanent network-allocated identifier for the terminal apparatus 104 to which both the D2D user identifier and temporary network-allocated identifier are mapped following completion of the service/application layer registration and registration to the network 106.

In embodiments where D2D registration area IDs are not used, the DRSF circuitry 126 may be configured to determine whether both an originating and terminating terminal apparatus 104 are configured for D2D connections and, if so, may facilitate establishment of a D2D connection between the originating and terminating terminal apparatuses 104. Accordingly, the originating terminal apparatus 104 may not need to detect the presence of the terminating apparatus 104 and then specifically request a D2D connection establishment. Instead, the originating terminal apparatus 104 may be configured to originate a generic connection establishment request and determination of whether a D2D connection may be established between the originating and terminating terminal apparatuses 104 may be left to the network. In some such embodiments, the DRSF circuitry 126 is configured to determine whether to facilitate establishment of a D2D connection or a standard cellular connection in response to a connection establishment request based at least in part on one or more of capabilities of the originating and terminating terminal apparatuses 104, a proximity between the originating and terminating terminal apparatuses 104, user-defined preferences for one or more of a user of the originating terminal apparatus 104 or a user of the terminating terminal apparatus 104, network operator configured preferences, or the like.

Figure 7:
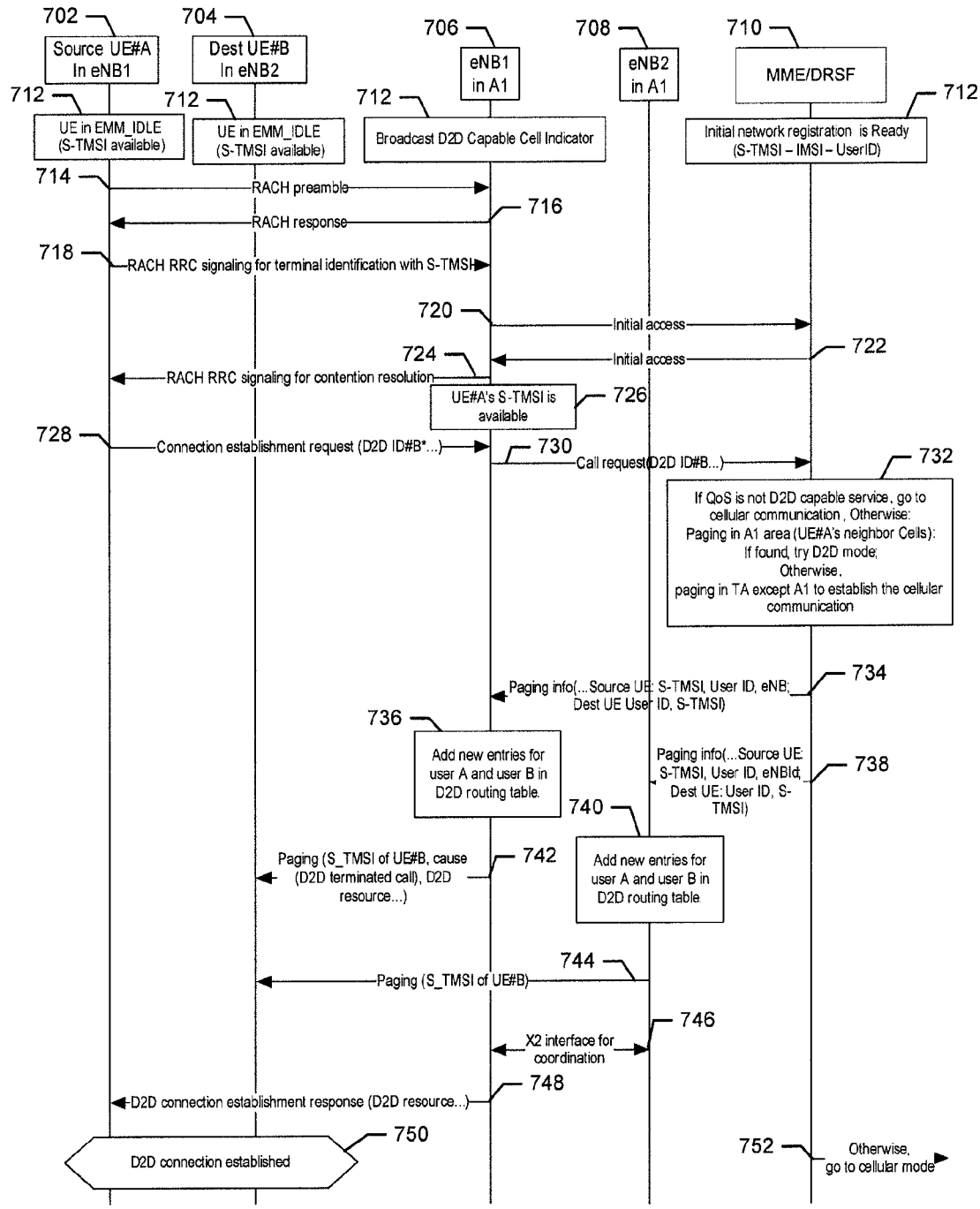
FIG. 7 illustrates a signaling diagram of signals that may be exchanged between entities configured according to a method for facilitating device-to-device connection establishment in accordance with an example embodiment of the invention.

FIG. 7 illustrates a signaling diagram of signals that may be exchanged between entities configured according to a method for facilitating device-to-device connection establishment in accordance with an example embodiment of the invention. In this regard, FIG. 7 illustrates a signaling diagram of signals that may be exchanged between entities of a cellular network according to a method wherein D2D registration area IDs are not used and the DRSF apparatus 102 is embodied in a core network element, such as an MME. Although FIG. 7 illustrates entities labeled in accordance with LTE-A standards, it will be appreciated that embodiments are not limited to LTE-A standards and may be implemented using other cellular network standards. The cellular network of the embodiment illustrated in FIG. 7 comprises a UE#A (user equipment #A) 702, UE#B (user equipment #B) 704, eNB1 706, eNB2 708, and MME/DRSF 710. The UE#A 702 and UE#B 704 may each comprise an embodiment of a terminal apparatus 104. Accordingly, operations illustrated in FIG. 7 to be performed by the UE#A 702 and UE#B 704 may, for example, be performed by and/or under the direction of D2D circuitry 118. The MME/DRSF 710 may comprise at least a portion an embodiment of a DRSF apparatus 102. It will be appreciated, however, that in various embodiments, the DRSF apparatus 102 comprises a distributed apparatus and thus aspects of the DRSF apparatus 102 may also be embodied, for example, on the eNB1 706 and/or eNB2 708. Accordingly, operations illustrated in FIG. 7 to be performed by the MME/DRSF 710 may, for example, be performed by and/or under the direction of DRSF circuitry 126. The UE#A 702 may be located in an area controlled by the eNB1 706 and the UE#B 704 may be located in an area controlled by the eNB2 708.

Operation 712 may comprise an initial state wherein UE#A 702 and UE#B 704 are in idle mode. eNB1 706 may broadcast, at operation 712, an indication that the cell is D2D capable. The MME/DRSF 710, at operation 712, may have access to a mapping of the D2D user IDs for UE#A 702 and UE#B 704 to their respective network-allocated identifier(s). Operation 714 may comprise the UE#A 702 transmitting a Random Access Channel (RACH) preamble toward the eNB 706. Operation 716 may comprise eNB1 706 transmitting an RACH response toward the UE#A 702. Operation 718 may comprise the UE#A 702 transmitting RACH radio resource control (RRC) signaling for identification of the UE#A 702 including a network-allocated identifier for the UE#A 702 (for example, S-TMSI). The RACH RRC signaling may additionally include an information element (IE) indicating that the UE#A 702 is D2D capable.

Operation 720 may comprise the eNB1 706 transmitting an initial access message toward the MME/DRSF 710. The MME/DRSF 710 may be configured to perform user authentication for the UE#A 702 based at least in part upon the initial access message. Operation 722 may comprise the MME/DRSF 710 transmitting an initial access response toward the eNB1 706. The initial access response may comprise a temporary network-allocated identifier, such as, for example, a S-TMSI, for the UE#A 702. Operation 724 may comprise the eNB1 706 transmitting RACH RRC signaling for contention resolution toward the UE#A 702. At operation 726, the eNB1 has access to the S-TMSI (or other network-allocated identifier) for UE#A 702 as a result of operation 718 and/or operation 722.

Operation 728 comprises the UE#A 702 originating a connection establishment request to establish a connection terminating with UE#B 704 and transmitting the connection establishment request toward the eNB1 706. The connection establishment request may comprise an identifier for the UE#B 704. Since the UE#A 702 may not have access to the D2D user identifier in the embodiment of FIG. 7, this identifier may comprise UE#B's mobile number, international mobile subscriber identifier, or other public identifier. The connection establishment request may further comprise an information element indicating that the UE#A 702 is D2D capable. The eNB1 706 may then transmit a call request toward the MME/DRSF 710, at operation 730.

Operation 732 may comprise the MME/DRSF 710 determining whether both UE#A 702 and UE#B 704 are D2D capable. If one or both of UE#A 702 and UE#B 704 are not D2D capable, then the MME/DRSF 710 may facilitate establishment of a cellular connection. However, when the MME/DRSF 710 determines that both the UE#A 702 and UE#B 704 are D2D capable, operation 732 may further comprise the MME/DRSF 710 determining whether a D2D or cellular connection should be established based at least in part on one or more of whether a D2D connection supports a requisite quality of service (QoS) for the requested connection, any user preferences for D2D or cellular connection, any network operator preferences for D2D or cellular connection, and/or the like. When the MME/DRSF 710 determines that a D2D connection may be established, the MME/DRSF 710 may determine a paging area. The paging area may comprise a cell by which the connection establishment request was received by the eNB1 706. The paging area may further comprise cells neighboring the cell by which the establishment request was received by the eNB1 706.

Operation 734 may comprise the MME/DRSF 710 transmitting a paging request toward the eNB1 706. This paging request may comprise information to allow the eNB1 706 to update a local routing, or mapping, table that the eNB1 706 may use to make a cellular/D2D connection mode selection at the eNB1 706. The eNB1 706 may further use the local routing table to assist in setting up a D2D connection. Operation 736 may comprise the eNB1 706 adding new entries for UE#A 702 and UE#B 704 in a D2D routing table maintained at the eNB1 706 based on the information included in the paging request. Operation 738 may comprise the MME/DRSF 710 transmitting a paging request toward the eNB2 708. This paging request may comprise information to allow the eNB2 708 to update a local routing, or mapping, table that the eNB2 708 may use to make a cellular/D2D connection mode selection at the eNB2 708. The eNB2 708 may further use the local routing table to assist in setting up a D2D connection. In this regard, the DRSF apparatus 102 may comprise some combination of two or more of the eNB1 706, eNB2 708, and MME/DRSF 710. Operation 740 may comprise the eNB2 708 adding new entries for UE#A 702 and UE#B 704 in a D2D routing table maintained at the eNB2 708 based on the information included in the paging request. Operation 742 may comprise the eNB1 706 transmitting a paging request for the UE#B 704. Operation 744 may comprise the eNB2 708 transmitting a paging request for the UE#B 704. In this regard, the determined paging area may comprise both the eNB1 706 and eNB2 708. Operation 746 may comprise the eNB1 706 and eNB2 708 communicating over the X2 interface to facilitate coordination.

Operation 748 may comprise the eNB1 706 transmitting a D2D connection establishment response toward the UE#A 702. The D2D connection establishment response may include a D2D resource allocation token. Operation 750 may comprise UE#A 702 and UE#B 704 establishing a D2D connection. If the MME/DRSF 710 determines at any point that establishing a D2D connection is not possible or otherwise inappropriate in accordance with policy or if the D2D connection establishment fails at operation 750, operation 752 may comprise the MME/DRSF 710 facilitating establishment of a cellular mode connection between the UE#A 702 and UE#B 704.

Figure 8:
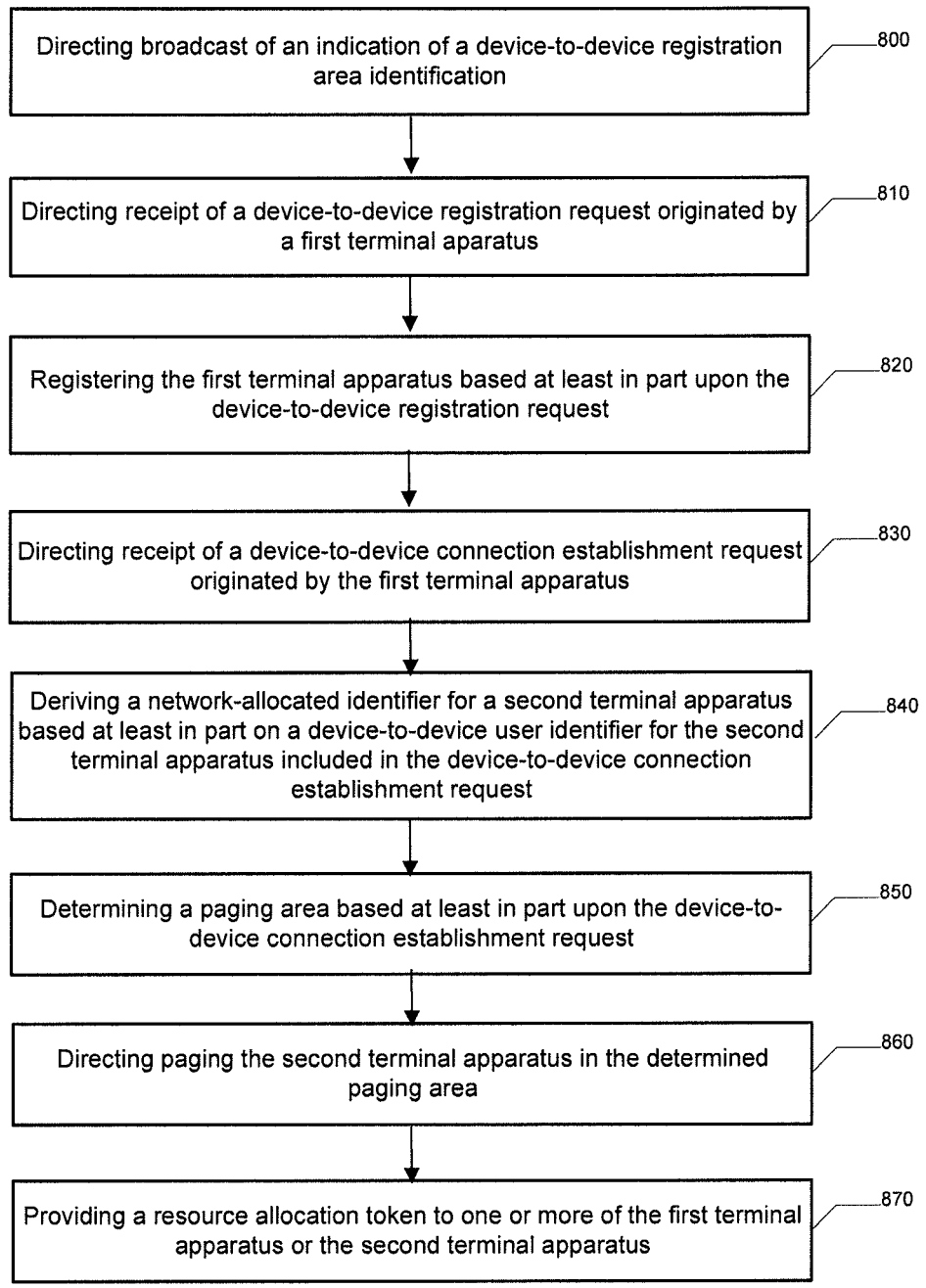
FIG. 8 illustrates a flowchart according to an example method for facilitating device-to-device connection establishment according to an example embodiment of the invention.

FIG. 8 illustrates a flowchart according to an example method for facilitating establishment of a device-to-device connection according to an example embodiment of the invention. In this regard, FIG. 8 illustrates operations that may, for example, be performed at a DRSF apparatus 102. The operations illustrated in and described with respect to FIG. 8 may, for example, be performed by and/or under the control of the DRSF circuitry 126. Operation 800 may comprise directing broadcast of an indication of a device-to-device registration area identification. Operation 810 may comprise directing receipt of a device-to-device registration request originated by a first terminal apparatus. Operation 820 may comprise registering the first terminal apparatus based at least in part upon the device-to-device registration request. Registering the first terminal apparatus may comprise, for example, storing a mapping between a D2D user identifier for the first terminal apparatus and a network-allocated identifier for the first terminal apparatus. Registering the first terminal apparatus may further comprise directing transmission of a D2D registration response toward the first terminal apparatus.

Operation 830 may comprise directing receipt of a D2D connection establishment request originated by the first terminal apparatus. The D2D connection establishment request may comprise a D2D user identifier for a second terminal apparatus. Operation 840 may comprise deriving a network-allocated identifier for a second terminal apparatus based at least in part on a D2D user identifier for the second terminal apparatus included in the D2D connection establishment request. In this regard, operation 840 may comprise searching the D2D registration database for a mapping including the D2D user identifier for the second terminal apparatus and/or communicating with another DRSF apparatus to derive the network-allocated identifier for the second terminal apparatus.

Operation 850 may comprise determining a paging area based at least in part upon the D2D establishment request. Operation 860 may comprise directing paging the second terminal apparatus in the determined paging area. Operation 870 may comprise allocating resources for a D2D connection between the first and second terminal apparatuses, generating a resource allocation token indicating the allocated resources, and providing the resource allocation token to one or more of the first terminal apparatus or the second terminal apparatus.

Figure 9:
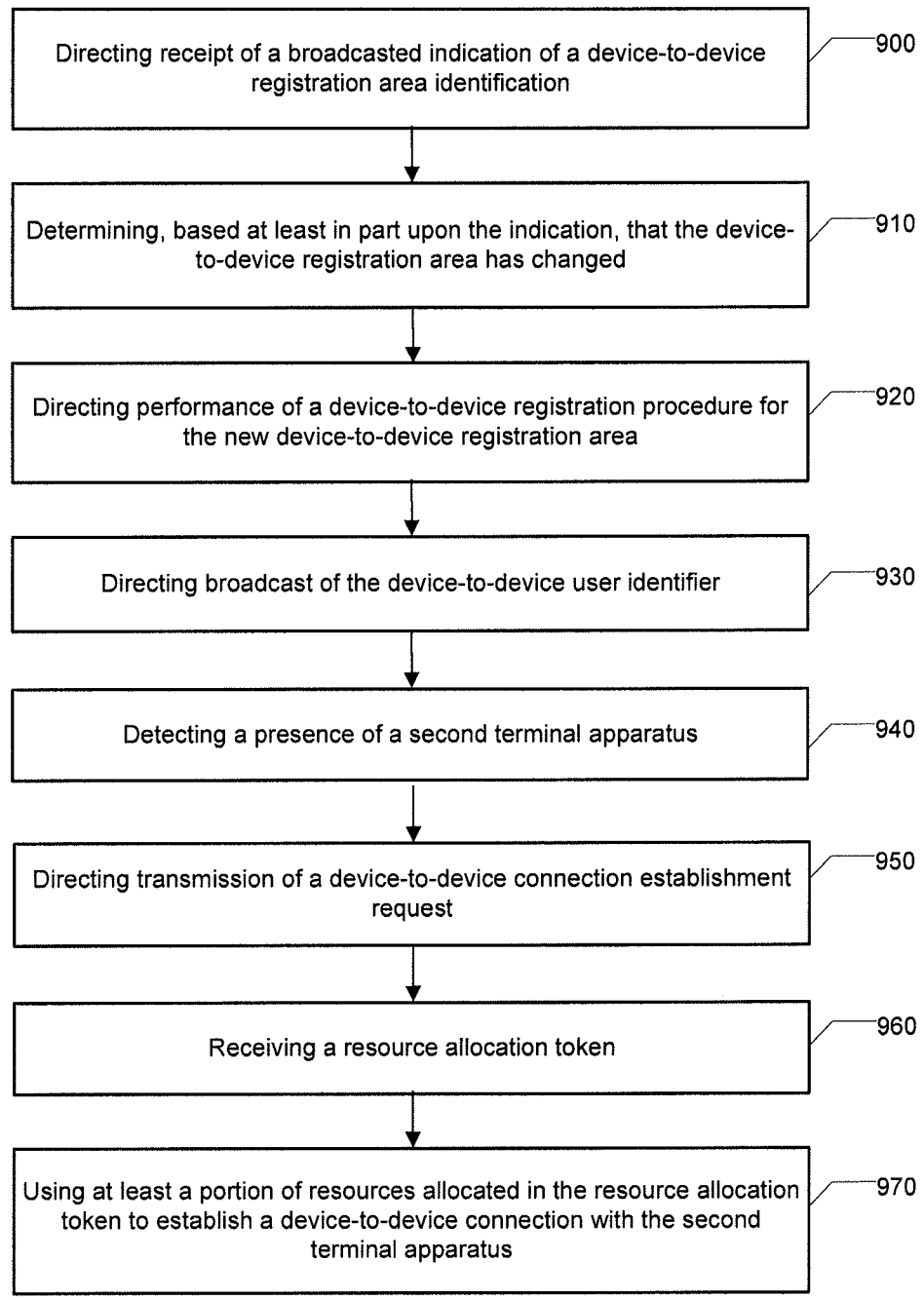
FIG. 9 illustrates a flowchart according to an example method for facilitating device-to-device connection establishment according to an example embodiment of the invention.

FIG. 9 illustrates a flowchart according to an example method for facilitating establishment of a device-to-device connection according to an example embodiment of the invention. In this regard, FIG. 9 illustrates operations that may, for example, be performed at a terminal apparatus 104. The operations illustrated in and described with respect to FIG. 9 may, for example, be performed by and/or under the control of the D2D circuitry 118. Operation 900 may comprise directing receipt of a broadcasted indication of a D2D registration area identification. Operation 910 may comprise determining, based at least in part upon the indication, that the D2D registration area has changed due to a change in the D2D registration area identification from the last known D2D registration area identification. Operation 920 may comprise directing performance of a D2D registration procedure for the new D2D registration area. Directing performance of a D2D registration procedure may comprise directing transmission of a D2D registration request toward a DRSF 102 and receiving a D2D registration response. Operation 930 may comprise directing broadcast of the D2D user identifier subsequent to completion of operation 920.

Operation 940 may comprise detecting a presence of a second terminal apparatus, such as due to receipt of a D2D user identifier broadcast by the second terminal apparatus. Operation 950 may comprise directing transmission of a D2D connection establishment request toward a DRSF apparatus 102. Operation 960 may comprise receiving a resource allocation token, such as may be included in a D2D connection establishment response originated by the DRSF apparatus 102. Operation 970 may comprise determining the resources allocated by the resource allocation token and using at least a portion of the allocated resources to establish a D2D connection with the second terminal apparatus.

Figure 10:
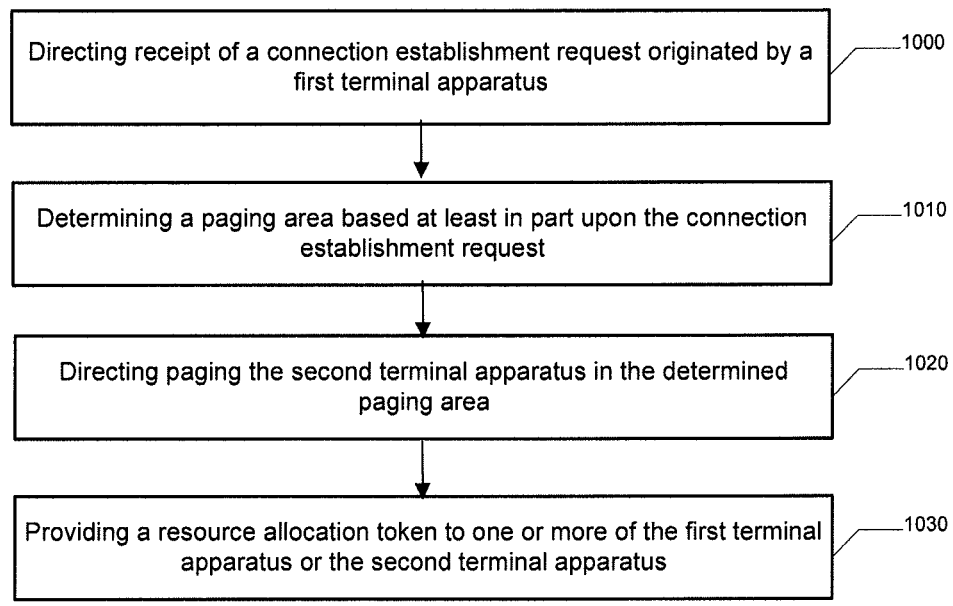
FIG. 10 illustrates a flowchart according to an example method for facilitating device-to-device connection establishment according to an example embodiment of the invention.

FIG. 10 illustrates a flowchart according to an example method for facilitating establishment of a device-to-device connection according to an example embodiment of the invention. In this regard, FIG. 8 illustrates operations that may, for example, be performed at a DRSF apparatus 102. The operations illustrated in and described with respect to FIG. 8 may, for example, be performed by and/or under the control of the DRSF circuitry 126. Operation 1000 may comprise directing receipt of a connection establishment request originated by a first terminal apparatus. The connection establishment request may request establishment of a connection between the first terminal apparatus and a second terminal apparatus. The connection establishment request may comprise a D2D connection establishment request or may comprise a generic connection establishment request that does not indicate a preference for a D2D connection. Operation 1010 may comprise determining a paging area based at least in part upon the connection establishment request. Operation 1020 may comprise directing paging the second terminal apparatus in the determined paging. Operation 1030 may comprise providing a resource allocation token to one or more of the first terminal apparatus or the second terminal apparatus.

FIGS. 8-10 are flowcharts of a system, method, and computer program product according to example embodiments of the invention. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device and executed by a processor in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, a terminal apparatus 104 and/or DRSF apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention provide several advantages to computing devices, computing device users, and network operators. Embodiments of the invention allow networks to handle registration of terminal apparatuses for D2D services and manage allocation of resources for D2D connections. For example, some embodiments of the invention allow network operators to manage resource allocation for in-band D2D communication such that D2D communication does not interfere with other communications over a host cellular network. In this regard, some embodiments of the invention allow a network operator to manage allocation of network resources to D2D connections through the use of resource allocation tokens.

In addition to giving networks the ability to manage resource allocation for D2D connections, embodiments of the invention reduce the burden imposed on networks by not requiring networks to have preliminary knowledge of whether terminal apparatuses on the network are capable of establishing a device-to-device connection. In this regard, terminal apparatuses in accordance with some embodiments of the invention use cognitive radio (CR) capabilities to sense other terminal apparatuses within a proximate range and then may send a request to the network to establish to establish a D2D connection with a sensed terminal apparatus. Accordingly, embodiments of the invention reduce signaling overhead that would otherwise be required to collect up-to-date measurement reports from a terminal apparatus regarding other terminal apparatuses within range of the terminal apparatus, as in accordance with embodiments of the invention, D2D user detection is distributed among the terminal apparatuses accessing the network and D2D connection establishment procedures are initiated by terminal apparatuses.

Embodiments of the invention further reduce the signaling and processing overhead required for registering D2D capable terminal apparatuses through the use of broadcast D2D registration area identification. A terminal apparatus according to an embodiment of the invention is enabled by such embodiments of the invention to determine when the terminal apparatus has entered a new D2D registration area and thus when the terminal apparatus needs to transmit a D2D registration request to the network. Accordingly, such embodiments of the invention may reduce the number of registration requests transmitted over the network and consequently may reduce the number of corresponding D2D registration procedures that network elements may have to execute. Some embodiments of the invention further provide for the use of paging areas that may reduce the number of cells over which a terminating terminal apparatus for a requested D2D connection is paged, thus reducing burden and overhead on network components that might otherwise be expended in paging a terminal apparatus over cells in which the terminating terminal apparatus can be determined not to be located based on a D2D connection establishment request.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
receiving a device-to-device registration request originated by a first terminal apparatus located within a device-to-device registration area; and
registering, by device-to-device registration server function circuitry, the first terminal apparatus based at least in part upon the device-to-device registration request;
wherein the device-to-device registration request comprises an indication of a device-to-device user identifier for the first terminal apparatus and a network-allocated identifier for the terminal apparatus,
wherein registering the first terminal apparatus comprises authenticating the first terminal apparatus based at least in part on the network-allocated identifier,
generating a mapping between the device-to-device user identifier and at least one of the network-allocated identifier or an updated network-allocated identifier, and
storing the generated mapping in a device-to-device registration database for the device-to-device registration area; and
transmitting a device-to-device registration response comprising an updated device-to-device network-allocated identifier to the first terminal apparatus.

2. The method of claim 1, wherein the device-to-device registration area is identified by a device-to-device registration area identification which is unique among a group of device-to-device registration areas comprising the device-to-device registration area and any neighboring device-to-device registration areas such that a terminal apparatus is enabled to determine when it is transitioning into a new device-to-device registration area and needs to originate a device-to-device registration request.

3. The method of claim 1, further comprising:
receiving a device-to-device connection establishment request originated by the first terminal apparatus, wherein the device-to-device connection establishment request comprises an indication of an identifier for a second terminal apparatus; and
paging, in response to receipt of the device-to-device connection establishment request, the second terminal apparatus to facilitate establishment of a device-to-device connection between the first terminal apparatus and the second terminal apparatus.

4. The method of claim 3, further comprising:
determining a paging area based at least in part upon the device-to-device connection establishment request; and wherein:
paging the second terminal apparatus comprises directing paging the second terminal apparatus only in the determined paging area.

5. The method of claim 4, wherein determining the paging area comprises:
determining a cell by which the device-to-device connection establishment request was received from the first terminal apparatus; and
defining the paging area to comprise the determined cell.

6. The method of claim 3, further comprising:
allocating a subset of available network resources for the device-to-device connection between the first terminal apparatus and the second terminal apparatus;
generating a token specifying the allocated network resources; and
providing the token to at least one of the first terminal apparatus or second terminal apparatus.

7. An apparatus comprising at least one processor and at least one memory storing computer program code, wherein the at least one memory and stored computer program code are configured to, with the at least one processor, cause the apparatus to at least:
receive a device-to-device registration request originated by a first terminal apparatus located within a device-to-device registration area; and
register the first terminal apparatus based at least in part upon the device-to-device registration request;
wherein the device-to-device registration request comprises an indication of a device-to-device user identifier for the first terminal apparatus and a network-allocated identifier for the terminal apparatus, and
wherein the at least one memory and stored computer program code are configured to, with the at least one processor, cause the apparatus to register the first terminal apparatus at least in part by authenticating the first terminal apparatus based at least in part on the network-allocated identifier, generating a mapping between the device-to-device user identifier and at least one of the network-allocated identifier or an updated network-allocated identifier, and storing the generated mapping in a device-to-device registration database for the device-to-device registration area; and
transmit a device-to-device registration response comprising an updated device-to-device network-allocated identifier to the first terminal apparatus.

8. The apparatus of claim 7, wherein the device-to-device registration area is identified by a device-to-device registration area identification which is unique among a group of device-to-device registration areas comprising the device-to-device registration area and any neighboring device-to-device registration areas such that a terminal apparatus is enabled to determine when it is transitioning into a new device-to-device registration area and needs to originate a device-to-device registration request.

9. The apparatus of claim 7, wherein the at least one memory and stored computer program code are configured to, with the at least one processor, further cause the apparatus to:
receive a device-to-device connection establishment request originated by the first terminal apparatus, wherein the device-to-device connection establishment request comprises an indication of an identifier for a second terminal apparatus; and
page, in response to receipt of the device-to-device connection establishment request, the second terminal apparatus to facilitate establishment of a device-to-device connection between the first terminal apparatus and the second terminal apparatus.

10. The apparatus of claim 9, wherein the at least one memory and stored computer program code are configured to, with the at least one processor, further cause the apparatus to:
determine a paging area based at least in part upon the device-to-device connection establishment request; and wherein:
the at least one memory and stored computer program code are configured to, with the at least one processor, cause the apparatus to page the second terminal apparatus only in the determined paging area.

11. The apparatus of claim 10, wherein the at least one memory and stored computer program code are configured to, with the at least one processor, cause the apparatus to determine the paging area at least in part by:

determining a cell by which the device-to-device connection establishment request was received from the first terminal apparatus; and defining the paging area to comprise the determined cell.

12. The apparatus of claim 9, wherein the at least one memory and stored computer program code are configured to, with the at least one processor, further cause the apparatus to:

allocate a subset of available network resources for the device-to-device connection between the first terminal apparatus and the second terminal apparatus;

generate a token specifying the allocated network resources; and provide the token to at least one of the first terminal apparatus or second terminal apparatus.

13. An apparatus comprising at least one processor and at least one memory storing computer program code, wherein the at least one memory and stored computer program code are configured to, with the at least one processor, cause the apparatus to at least:

determine a paging area for a first terminal apparatus based at least in part upon a connection establishment request originated by the first terminal apparatus seeking to establish a connection with a second terminal apparatus;

page the second terminal apparatus only in the determined paging area to facilitate establishment of a device-to-device connection between the first terminal apparatus and the second terminal apparatus in response to the connection establishment request;

determine a cell by which the device-to-device connection establishment request was received from the first terminal apparatus; and determine the paging area by defining the paging area to comprise the determined cell.

14. The apparatus of claim 13, wherein the at least one memory and stored computer program code are configured to, with the at least one processor, cause the apparatus to determine the paging area by further defining the paging area to comprise one or more cells neighboring the determined cell.

15. The apparatus of claim 13, wherein the at least one memory and stored computer program code are configured to, with the at least one processor, cause the apparatus to determine the paging area by further defining the paging area to comprise one or more cells within a device-to-device registration area in which the second terminal apparatus is registered.

16. The apparatus of claim 13, wherein the at least one memory and stored computer program code are configured to, with the at least one processor, further cause the apparatus to:

determine based at least in part upon the connection establishment request whether to facilitate establishment of a device-to-device connection or a cellular connection.

* * * * *